US007587256B2

(12) United States Patent
Goldman

(10) Patent No.: US 7,587,256 B2
(45) Date of Patent: Sep. 8, 2009

(54) AUTOMATICALLY GENERATING EMBROIDERY DESIGNS FROM A SCANNED IMAGE

(75) Inventor: David A. Goldman, Vestal, NY (US)

(73) Assignee: SoftSight, Inc., Vestal, NY (US)

( * ) Notice: Subject to any disclaimer, the term of this patent is extended or adjusted under 35 U.S.C. 154(b) by 0 days.

(21) Appl. No.: 10/806,880

(22) Filed: Mar. 23, 2004

(65) Prior Publication Data

US 2004/0243275 A1 Dec. 2, 2004

Related U.S. Application Data

(63) Continuation of application No. 09/950,521, filed on Sep. 10, 2001, now Pat. No. 6,804,573, which is a continuation of application No. 09/134,981, filed on Aug. 17, 1998, now Pat. No. 6,836,695.

(51) Int. Cl.
*D05C 5/02* (2006.01)
(52) U.S. Cl. .................................... 700/138; 112/475.19
(58) Field of Classification Search ................. 700/138, 700/136, 137, 130, 131, 132; 112/102.5, 112/470.06, 475.19
See application file for complete search history.

(56) References Cited

U.S. PATENT DOCUMENTS

| 5,191,536 | A | * | 3/1993 | Komuro et al. ............. 700/138 |
| 5,270,939 | A | | 12/1993 | Goldberg et al. |
| 5,320,054 | A | * | 6/1994 | Asano ..................... 112/102.5 |
| 5,323,722 | A | | 6/1994 | Goto et al. |
| 5,410,976 | A | * | 5/1995 | Matsubara ............... 112/102.5 |
| 5,430,658 | A | | 7/1995 | Divinsky et al. |
| 5,444,640 | A | | 8/1995 | Hirai |
| 5,510,994 | A | | 4/1996 | Tsonis et al. |
| 5,559,771 | A | | 9/1996 | Kim |
| 5,576,968 | A | | 11/1996 | Mizuno et al. |

(Continued)

OTHER PUBLICATIONS

Gunilla Borgefors, *Distance Transformations in Digital Images*, 34 Computer Vision Graphics, and Image Processing, pp. 334-371 (1986).

(Continued)

*Primary Examiner*—Gary L Welch
*Assistant Examiner*—Nathan E Durham
(74) *Attorney, Agent, or Firm*—Hanley, Flight & Zimmerman, LLC

(57) ABSTRACT

A method and system are disclosed for automatically generating embroidery designs from a scanned image. An embroidery data generating mechanism generates accurate embroidery designs. The embroidery data generating mechanism first reads an image data file, which contains bitmapping information generated from a software scanning tool, the information being related to an embroidery pattern that has been scanned. The scanned pattern is broken up into pixels, each pixel in the scanned image having a bitmap associated with the color of the pattern. Each unique color in the scanned pattern has its own unique bitmap. The embroidery generating mechanism also includes a segmentation mechanism and a chain-encoding mechanism which perform operations to enhance the quality of the bitmapped information and to separate regions of the scanned image into objects. A distance transform evaluation mechanism classifies each object as being either a thick object or a thin, predominantly regular object. Additional mechanisms further interpret the objects into entities such as regular and singular regions and compute optimum sewing paths for embroidery data generation.

30 Claims, 16 Drawing Sheets

U.S. PATENT DOCUMENTS

| | | | | |
|---|---|---|---|---|
| 5,668,730 | A | | 9/1997 | Tsonis et al. |
| 5,740,056 | A | | 4/1998 | Futamura et al. |
| 5,751,583 | A | | 5/1998 | Kyuno et al. |
| 5,791,271 | A | | 8/1998 | Futamura |
| 5,823,127 | A | * | 10/1998 | Mizuno ............... 112/102.5 |
| 5,839,380 | A | * | 11/1998 | Muto ................. 112/102.5 |
| 5,911,182 | A | | 6/1999 | Uyama et al. |
| 5,957,068 | A | * | 9/1999 | Mizuno ............... 112/102.5 |
| 6,010,238 | A | * | 1/2000 | Kotaki ................. 700/138 |
| 6,397,120 | B1 | * | 5/2002 | Goldman .............. 700/138 |

OTHER PUBLICATIONS

Gabriella Sanniti Di Bata et al., (3,4) *Weighted Skeleton Decomposition for Pattern Representation and Description*, 27 Pattern Recognition, pp. 1039-1049 (1994).

David S. Doermann et al., *The Interpretation and Reconstruction of Interfering Strokes*, pp. 41-51.

Robert M. Haralick et al., *Glossary of Computer Vision Terms*, 24 Pattern Recognition, pp. 69-93 (1991).

Oivind Due Trier et al., *Feature Extraction Methods for Character Recognition—A Survey*, 29 Pattern Recognition pp. 641-661 (1996).

Narenda Ahuja and Jen-Hui, *Shape Representation Using a Generalized Potential Field Model*, 19 IEEE Transactions On Pattern Analysis and Machine Intelligence 169-176 pp (1997).

Carlo Arcelli et al., *A One-Pass Two-Operation Process to Detect the Skeletal Pixels on the 4-Distance Transform*, 11 IEEE Transactions On Pattern Anaysis and Machine Intelligence pp. 411-414, Apr. 1998.

Herbert Freeman et al., *A Corner-Finding Algorithm for Chain-Coded Curves*, IEEE Tranactions on Computers, pp. 297-303 (1997).

Chia-We Liao and Jun S. Huang, *Stroke Segmentation by Bernsterin-Bezier Curve Fitting*, 23 Pattern Recognition, pp. 478-484 (1990).

Shigehehiro Fukushima, *Division-Based Analysis of Symmetry and Its Application*, 19 IEEE Transactions On Pattern Analysis and Machine Intelligence, pp. 144-148.

Remi Ronford, *Region-Based Strategies for Active Contour Models*, 13 International Journal of Computer Vision, pp. 229-251 (1994).

I.S.I. Abuhaiba et al., *Processing of Binary Images of Handwritten Text Documents*, pp. 1161-1177 (1996).

Stefan Carlsson, *Projectively Invariant Decomposition and Recognition of Planar Shapes*, 17(2) International Journal of Computer Vision, pp. 193-209 (1996).

Richard C. Staunton, *An Analysis of Hexagonal Thinning Algorithms and Skeletal Shape Representation*, 29 Pattern Recognition, pp. 1131-1146 (1996).

Fernando Rannou et al., *Equilateral Polygon Approximation of Closed Contours*, 29 Pattern Recognition, pp. 1105-1115 (1996).

Benjamin B. Kimia et al., *Shapes Shocks, and Deformations I: The Components of Two-Dimensional Shape and the Reaction-Diffusion Space*, 15 International Journal of Computer Vision, pp. 189-224 (1995).

Gideon Guy et al., *Inferring Global Perceptual Contours From Local Features*, 20 International Journal of Computer Vision, pp. 113-133 (1996).

Roberto Marcondes Cesar Junior et al., *Towards Effective Planar Shape Representation With Multiscale Digital Curvature Analysis Based on Signal Processing Techniques*, 29 Pattern Recognition, pp. 1559-1569 (1996).

Paul C. K. Kwok, *A Thinning Algorithm by Contour Generation*, 31 Communications of the ACM, pp. 1314-1324 (1988).

Paul L. Rosin et al., *Segmentation of Edges Into Lines and Arcs*, Image and Vision Computing, pp. 109-114 (1989).

Hirobumi Nishida, *Structural Feature Extraction Using Multiple Bases*, 62 Computer Vision and Image Understanding, pp. 78-89 (1995).

G.A.W. West et al., *Techniques for Segmenting Image Curves Into Meaninful Descriptions*, 24 Pattern Recognition, pp. 643-652 (1991).

Wenhua Wan et al., *Segmentation of Planar Curves into Straight-Line Segments and Elliptical Arcs*, 59 Graphical Models and Image Processing, pp. 484-494 (1997).

Ju Jia Zou et al., *Skeletonization of Ribbon-Like Shapes Based on Regularity and Singularity Analyses*, 31 IEEE Transactions on Systems, Man, and Cybernetics-Part B: Cybernetics (2001).

Hirobumi Nishida, *Structural Feature Indexing for Retrieval of Partially Visible Shapes*, 35 Pattern Recognition, pp. 55-67 (2002).

Ji-Rong Lin et al., *Stroke Extraction for Chinese Characters Using a Trend-Followed Transcribing Technique*, 29 Pattern Recognition, pp. 1789-1805.

M. Pilar Martinez-Perez et al., *A Thinning Algorithm Based on Contours*, 39 Computer Vision, Graphics, and Image Processing, pp. 186-201 (1987).

Elyse H. Milun et al., *General Ribbon-Based Thinning Algorithms for Stylus-Generated Images*, 76 Computer Vision and Image Understanding, pp. 267-277 (1999).

Irwin Sobel, *Neighborhood Coding of Binary Images for Fast Contour Following and General Binary Array Processing*, 8 Computer Graphics and Image Processing, pp. 127-135 (1978).

C.A. Rothwell, et al., *Planare Object Recognition Using Projective Shape Representation*, 16 International Journal of Computer Vision, pp. 57-99 (1995).

I.S.I. Abuhaiba et al., *Fuzzy State Machines to Recognize Totally Unconstructed Handwritten Strokes*, 13 Image and Vision Computing, pp. 755-769 (1995).

Serban Iliescu et al., *Proposed Heuristic Procedures to Preprocess Character Patterns Using Line Adjacency Graphs*, 29 Pattern Recognition, pp. 951-969 (1996).

Fu Chang et al., *Feature Analysis Using Line Sweep Thinning Algorithm*, 21 IEEE Transactions on Pattern Analysis and Machine Intelligence, pp. 145-158 (1996).

Hyeong In Choi et al., *New Algorithm for Medial Axis Transform of Plance Domain*, 59 Graphical Models and Image Processing, pp. 463-483 (1997).

Toshiyuki Imai, *A Topology-Oriented Algorithm for Voronoi Diagram of Polygons*.

Martin Held, *VRONI: An Engineering Approach to the Reliable and Efficient Computation of Voronoi Diagrams of Points and Line Segments*, 18 Computational Geometry, pp. 95-123 (2001).

Kokichi Sugihara, *A Robust Topology-Oriented Incremental Algorithm For Voronoi Diagrams*, 4 International Journal of Computational Geometry and Applications, pp. 179-228 (1994).

Nikolaos G. Bourbakis, *A Rules Based Scheme for Synthesis of Texture Images*, pp. 999-1003.

Takashi Ida et al., *Self-Affine Mapping System and Its Application to Object Contour Extracation*, 9 IEEE Transactions On Image Processing, pp. 1926-1936 (2000).

Takashi Ida et al., *Self-Affine Mapping System for Object Contour Extraction*, pp. 250-254 (2000).

Wei-Ying Ma et al., *Edge Flow: A Technique for Boundary Detection and Image Segmentation*, 9 IEEE Transactions on Image Processing, pp. 1375-1387 (2000).

Giancarlo Iannizzotto et al., *Fast and Accurate Edge-Based Segmenation With No Contour Smoothing in 2-D Real Images*, 9 IEEE Transactions On Image Processing, pp. 1232-1237 (2000).

Tony F. Chan et al., *Active Contours Without Edges*, 10 IEEE Transactions on Image Processing, pp. 266-277 (2001).

Mary L. Comer et al., *The EM/MPM Algorithm for Segmentation of Textured Images: Analysis and Further Experimental Results*, 9 IEEE Transactions on Image Processing, pp. 1731-1744 (2000).

Gerard J. Genello et al., *Graeco-Latin Squares Design for Line Detection in the Presence of Correlated Noise*, 9 IEEE Transactions On Image Processing, pp. 609-622 (2000).

Michael K. Schneider et al., *Multiscale Methods for the Segmenation and Reconstruction of Signals and Images*, 9 IEEE Transactions On Image Processing, pp. 456-467 (2000).

Mario A. T. Figueiredo, *Unsupervised Contour Representation and Estimation Using B-Splines and a Minimum Description Length Criterion*, p. 1075-1087 (2000).

Mahmoud Ramze Rezaee et al., *A Multiresolution Image Segmentation Technique Based on Pyramidal Segementation and Fuzzy Clustering*, 9 IEEE Transactions On Image Processing, pp. 1238-1248 (2000).

Aart Bik et al., *Efficient Exploitation of Parallelism on Pentium III and Pentium 4 Processor-Based Systems*, Intel Technology Journal Q1, pp. 1-9 (2001).

Peter W. Shor et al., *Detecting and Decomposing Self-Overlapping Curves*, ACM, pp. 44-50 (1989).

Louisa Lam et al., *Thinning Methodologies—A Comprehensive Survey*, 14 IEEE Transactions On Pattern Analysis and Machine Intelligence, pp. 869-885 (1992).

Gabriella Sannti Di Baja, *Well-Shaped, Stable,and Reversible Skeletons from the(3,4)-Distance Transform*, 5 Journal of Visual Communication and Image Representation, pp. 107-115 (1994).

S. Di Zeno, *Run-Based Algorithms for Binary Image Analysis and Processing*, 18 IEEE Transaction On Pattern Analysis and Machine Intelligence, pp. 83-88 (1996).

H. Nishida et al., *Thin Line Representation From Contour Reprsentation of Handprinted Characters*, Pixels to Features III: Frontiers in Handwriting Recognition, pp. 29-39 (1992).

Richard G. Casey et al., *A Survey of Methods and Strategies in Character Segmentation*, 18 IEEE Transactions On Pattern Analysis and Machine Intelligence, pp. 691-705 (1996).

Meir Barozhar et al., *Automatice Findind of Main Roads in Aerial Images by Using Geometric Stochastic Models and Estimation*, 18 IEEE Transactions On Patern Analysis and Machine Intelligence, pp. 707 (1996).

David S. Doermann et al., *Recovery of Temporal Information From StaticImages of Handwriting*, 15 International Journal of Computer Vision, pp. 143-164 (1995).

Evan C. Sherbrooke et al., *Differential and Topological Properties of Medial Axis Transforms*, 58 Graphical Models and Image Processing, pp. 574-592 (1996).

G.F. McLean, *Geometric Correctionof Digitized Art*, 58 Graphical Models and Image Processing, pp. 142-154 (1996).

Hsin-Teng Sheu et al., *A Rotationally Invariant Two-Phase Scheme For Corner Detection*, 29 Pattern Recognition, pp. 819-828 (1996).

Magdi Mohamed et al., *Handwritten Word Recognition Using Segmentation-Free Hidden Markov Modeling and Segmentation-Based Dynamic Programming Techniques*, 18 IEEE Transactions on Pattern Analysis and Machine Intelligence, pp. 548-554 (1996).

Hirobumi Nishida, *Model-Based Shape Matching With Structural Feature Grouping*, 17 IEEE Transactions on Pattern Analysis and Machine Intelligence, pp. 315-320 (1995).

Steven Gold et al., *A Graduated Assignment Algorithm for Graph Matching*, 18 IEEE Transactions On Pattern Analysis and Machine Intelligence, pp. 377-388 (1996).

Jianying Hu, *A Hierarchial Approach to Efficient Curvilinear Object Searching*, pp. 208-220 (1996).

Paul L. Rosin, *Augmenting Corner Descriptors*, 58 Graphical Models and Image Processing, pp. 286-294 (1996).

Panagiotis G. Tzionas et al., *Collision-Free Pathn Planning for Diamond-Shaped Robot Using Two-Dimensional Cellular Automata*, 13 IEEE Transactions On Robotics and Automation, pp. 237-250 (1997).

Hirobumi Nishida, *A Structural Model of Curve Deformation by Discontinuous Transformations*, 58 Graphical Models and Image Processing, pp. 164-179 (1996).

Ramanujan S. Kashi et al., *2-D Shape Representation and Averaging Using Normalized Wavelet Descriptors*, 66 Simulation, pp. 164-178 (1996).

Shy-Shyan et al., *Skeletonization for Fuzzy Degraded Character Images*, 5 IEEE Transactions On Image Processing, pp. 1481-1485 (1996).

Paul L. Rosin et al., *Nonparametric Segmentation of Curves Into Various Representations*, 17 IEEE Transactions On Pattern Analysis and Machine Intelligence, pp. 1140-1153(1995).

* cited by examiner

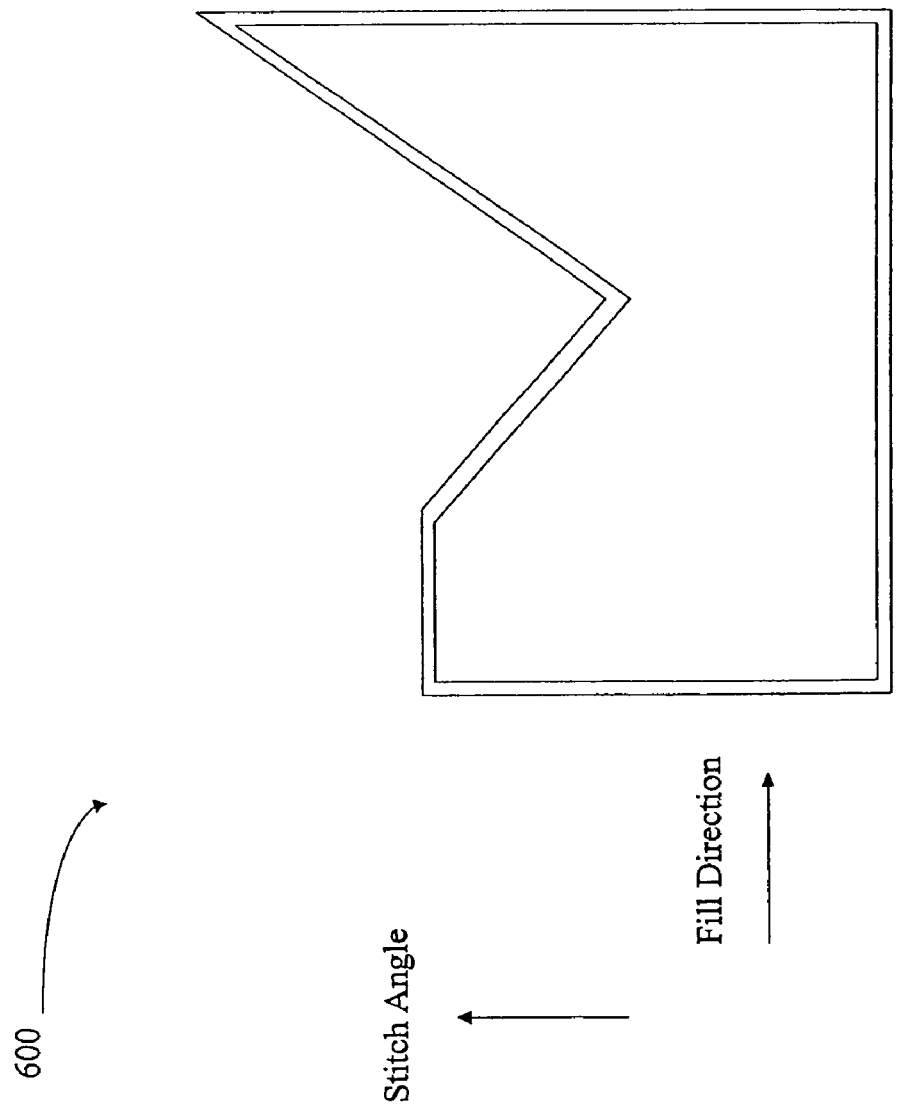

AUTOMATICALLY GENERATING EMBROIDERY DESIGNS FROM A SCANNED IMAGE

RELATED APPLICATION

This application is a continuation of U.S. patent application Ser. No. 09/950,521, filed on Sep. 10, 2001, now U.S. Pat. No. 6,804,573 which is a continuation of U.S. patent application Ser. No. 09/134,981, filed on Aug. 17, 1998 now U.S. Pat. No. 6,836,695.

FIELD OF THE INVENTION

The present invention pertains to the field of embroidery stitching. More specifically, the present invention relates to automatic generation of embroidery designs.

BACKGROUND OF THE INVENTION

The needle and thread were the early sewing tools needed for mending and repairing damaged clothing. It was then discovered that the needle could be used as an artistic tool to stitch patterns of thread that displayed colorful designs. This patterning of thread into designs has become known as the art of embroidery. Over time, embroidery designs have been displayed on various items ranging in size and complexity from simple handkerchiefs to shirts and quilts.

Just as the sewing machine has automated the task of sewing, various mechanisms have been used to automate the art of embroidery. For example, it has become known that a computer can be used to assist or aid in the generation of embroidery designs. Typically an embroidery design is recreated from a pattern that is displayed on paper. However, when a computer is used to create an embroidery design, many factors must be considered in order to produce an accurate interpretation of the pattern. Factors such as color contrast, line thickness and general object recognition, which are easily identifiable by the human eye are sometimes not easily interpreted by a computer.

Currently, embroidery may be produced using a motorized sewing mechanism combined with a synchronized movable frame that holds material to be embroidered underneath the sewing needle. Specifically, as the sewing needle is moved up and down, the movable frame may be precisely shifted in x,y coordinate space via two stepping motors that are directed by a special purpose microcontroller. Thus, the length and direction of each stitch is specified by the x,y position of the frame at the time each of the two needle penetrations that compose the stitch are made. In this way, various types of stitching may be recreated at arbitrary locations on material within the frame. Embroidery data used as input to such a machine typically consists of a series of x,y coordinates specifying the locations at which stitches (i.e., needle penetrations) should be placed. This type of embroidery data may be very difficult and tedious for a human operator to specify by hand. Hence, many CAD (computer-aided design) packages have been created to aid in the embroidery data creation process. Typically, these systems define simple high-level primitives that may be used to generate large groups of individual stitches by simply specifying only a few key points. For example, a set of zig-zag or satin stitches may be specified by setting a stitch density value and providing four points that define a bounding polygon for the stitches. This is illustrated in FIG. 12a. Similarly, large areas may be filled using parallel rows of continuous stitching by simply specifying the boundaries of those areas as illustrated in FIG. 12b. However, as design complexity grows, even using these high-level primitives to define embroidery data becomes time consuming and tedious. Additionally, the user of such embroidery data generation systems must have expert knowledge in terms of understanding and being able to apply these high-level embroidery data primitives. Thus, the focus of the present invention is to provide a means of automatically generating information from scanned images that correctly specifies high-level primitives and their required data points such that the original scanned image may be directly converted to embroidery design data. Furthermore, the automation of this process should allow the conversion to be fast while not requiring any expertise on the part of the user.

Computer systems have been developed for generating specific types of embroidery designs. For example, U.S. Pat. No. 5,510,994 describes a system that allows a pattern to be scanned into a computer. When patterns are scanned into the computer, the scanner creates a file which depicts the characteristics of the scanned image. Once the file is created, these systems require human manipulation of the image to identify and distinguish its certain characteristics. For example, the user provides the outline in the image. This method of generating embroidery designs is not fully automated, since human manipulation of the image is required to ensure its accuracy. As a result of the required human interaction, this method of generating designs is inefficient and cumbersome.

A particular embroidery pattern cannot ever conform to any particular characteristics. Each pattern contains unique characteristics such as size and color. Depending upon how complex the pattern is, the human interaction required to interpret the scanned image may be significant, which thereby hampers the efficiency of the system.

U.S. Pat. No. 5,740,056 describes a method and device for producing embroidery data that also uses image data that has been scanned into a file. The file is read by the embroidery data producing device to produce an embroidered stitch representation of the image whose data is stored in that file. However, this system has many limitations. First, the input image must be limited to very simple black and white line art. There is no provision for color images or complex black and white line art containing one or more areas of singularity. Also, no effort is made to remove or reduce noise that may be present within the scanned image. These factors severely limit the type of artwork that may serve as input to the system. Additionally, the description of key mechanisms employed by the system detail serious faults that may cause the system to produce erroneous results. For example, the means by which the system derives thickness information pertaining to contiguous objects within an image is incorrect. Specifically, this means of computation could erroneously indicate that objects are substantially and arbitrarily thicker than they are in actuality. To contrast this, in the present invention, the methods employed here to provide thickness information utilize well-researched integer distance transform algorithms that guarantee accurate thickness approximation bounded by known percentage errors. Also, the prior art invention does not consider exterior contour or edge information during the embroidery generation process. Hence, additional detail is lost relative to the original scanned image that further reduces the quality and accuracy of the resultant embroidery data. Finally, no method is provided for detecting, converting, or generating embroidery data for complex objects that are not classifiable as either thin or thick lines. Thus, the present invention, while within the same field, is a substantially different and more capable system.

As the complexity of items that require embroidery increases, the need for better mechanisms for automatically generating embroidery designs from a pattern becomes more apparent. To the extent that a mechanism cannot efficiently and accurately interpret intricate scanned patterns into embroidery designs, the ability to automate embroidery stitching is impaired.

SUMMARY OF THE INVENTION

In accordance with a preferred embodiment of the present invention, a method and apparatus for automatically generating embroidery design data from a scanned image is provided. The preferred embodiment of the present invention includes an embroidery generating mechanism which automatically and efficiently generates accurate embroidery design data.

The embroidery generating mechanism first reads a file, herein referred to as image data. The image data contains bitmapping information generated from a software scanning tool, the information being related to an embroidery pattern that is to be generated. The scanned pattern is broken up into pixels, each pixel in the scanned image having an associated color value.

The embroidery generating mechanism includes a segmentation mechanism and a chain-coding mechanism which perform operations to enhance the quality of the bitmapped information and to separate regions of the scanned image into objects. A distance transform (DT) evaluation mechanism also included within the embroidery generating mechanism classifies each object as being either a thick object or a thin, predominantly regular object. The term regular is used to describe a region that is not singular. Typically, a regular region may be characterized as a contiguous region with a relatively constant thickness along a clear unobstructed path. As an example, the strokes of a character could be described as a set of regular regions joined by singularities present at points where strokes touch or intersect with each other. A more thorough discussion of regularities and singularities may be found in image processing literature, such as in Rocha, J. and Bernardino, R., "Singularities and Regularities on Line Pictures via Symmetrical Trapezoids," IEEE Transactions on Pattern Analysis and Machine Intelligence, Vol. 20, No. 4, April 1998 pp. 391-395.

If the DT evaluation mechanism determines that an object is thick or irregular, the DT computation mechanism executes a line fitting mechanism, a stitch angle determination mechanism, a fragment generation mechanism, a generational path mechanism and finally an embroidery data output mechanism.

Conversely, if the DT evaluation mechanism determines that an object is a thin, predominantly regular object, the DT evaluation mechanism executes a fitting mechanism, a labeling mechanism, a merging mechanism, a coding mechanism, a column smoothing mechanism, a path generation mechanism and finally the embroidery output mechanism.

When the embroidery output mechanism executes, the mechanism has access to all output data needed for creating an embroidery design that is equivalent to the scanned pattern. The present invention provides a completely automated, efficient and accurate method for generating embroidery data from a scanned image.

BRIEF DESCRIPTION OF THE DRAWINGS

The preferred exemplary embodiments of the present invention will hereinafter be described in conjunction with the appended drawings, where like designations denote like elements, and:

FIGS. 6a and 6b depict a fill stitch region with the resulting fragmentation when two different possibilities for choosing a stitch angle and a fill direction are used;

FIG. 14a displays the original object after segmentation. FIG. 14b displays the original object with DT values for each pixel written in hexadecimal. Pixels highlighted in white represent the skeletal pixels of the object while pixels highlighted in dark grey represent the chain-coded edges of the object.

DESCRIPTION OF THE PREFERRED EMBODIMENT

Figure 1:
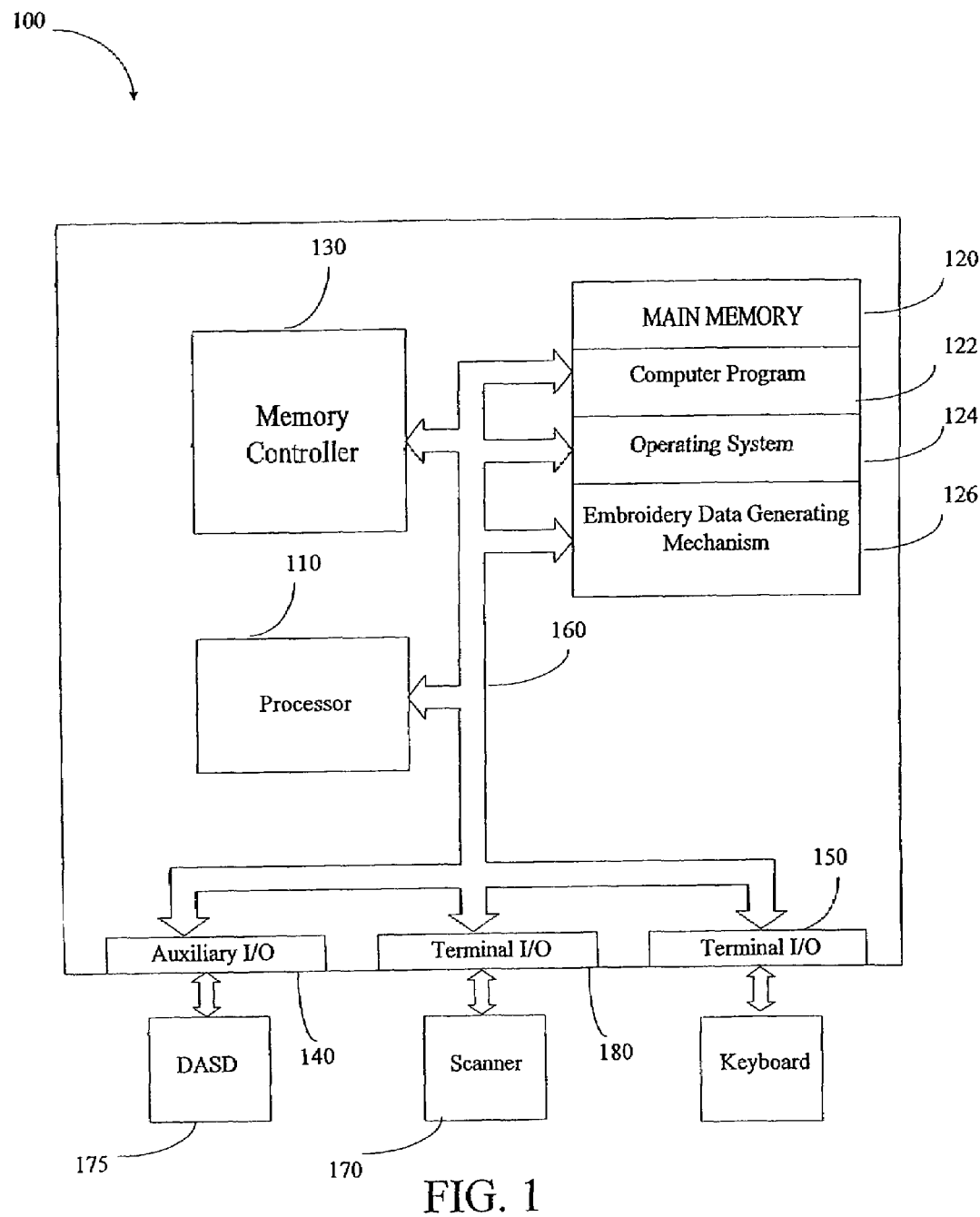
FIG. 1 is a block diagram of a computer system in accordance with a preferred embodiment of the present invention.

Referring now to FIG. 1, a computer system 100 in accordance with a preferred embodiment of the present invention is shown. It should be understood that the method and apparatus of the present invention apply equally to any computer system, regardless of whether the computer system is a complicated multi-user computing apparatus or a single user device such as a personal computer or workstation. Computer system 100 includes a processor 110, main memory 120, a memory controller 130, an auxiliary storage interface 140, and a terminal interface 150, all of which are interconnected via a system bus 160.

Note that various modifications, additions, or deletions may be made to computer system 100 illustrated in FIG. 1 within the scope of the present invention, such as the addition of cache memory or other peripheral devices. A preferred embodiment of the present invention utilizes a file containing bitmapped image data. This data can be read into the file using a scanner 170 connected through terminal interface 150. It should also be understood that a sewing machine that can be used for embroidery may be connected to computer system 100 through a second terminal interface 180 in accordance with the present invention.

Processor 110 performs computation and control functions of computer system 100, and comprises a central processing unit (CPU). Processor 110 may include a single integrated circuit, such as a microprocessor, or any suitable number of integrated circuit devices and/or circuit boards working in cooperation to accomplish the functions of a processor. Processor 110 executes an object-oriented computer program 122 within main memory 120.

Auxiliary storage interface 140 allows computer system 100 to store and retrieve information from auxiliary storage devices, such as magnetic disk (hard disks or floppy diskettes) or optical storage devices (CD-ROM). One suitable storage device is a direct access storage device (DASD) 175. As shown in FIG. 1, DASD 175 may be a floppy disk drive which may read programs and data from a floppy disk 185. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution.

Examples of signal bearing media include: recordable type media such as floppy disks (disk 180) and CD ROMS, and transmission type media such as digital and analog communication links, including wireless communication links.

Memory controller 130, through use of a processor (not shown), separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Similarly, although the system bus 160 of the preferred embodiment is a typical hardwired, multidrop bus, any connection means that supports-directional communication in a computer-related environment could be used.

Main memory 120 contains one or more computer programs 122, an operating system 124, and an embroidery generating mechanism 126. Computer program 122 in memory 120 is used in its broadest sense, and includes any and all forms of computer programs, including source code, intermediate code, machine code, and any other representation of a computer program.

It should be understood that main memory 120 need not necessarily contain all parts of all mechanisms shown. For example, portions of computer program 122 and operating system 124 may be loaded into an instruction cache (not shown) for processor 110 to execute, while other files may well be stored on magnetic or optical disk storage devices (not shown). In addition, although computer program 122 is shown to reside in the same memory location as operating system 124 and embroidery generating mechanism 126, it is to be understood that main memory 120 may consist of multiple disparate memory locations.

A preferred embodiment of the present invention provides an embroidery generating mechanism which automatically, efficiently and accurately generates embroidery design data output from embroidery image data. An embroidery device receives the embroidery design data output and stitches the design according to the output. The resulting stitched embroidery design is a nearly flawless reproduction of the original image data.

Figure 2:
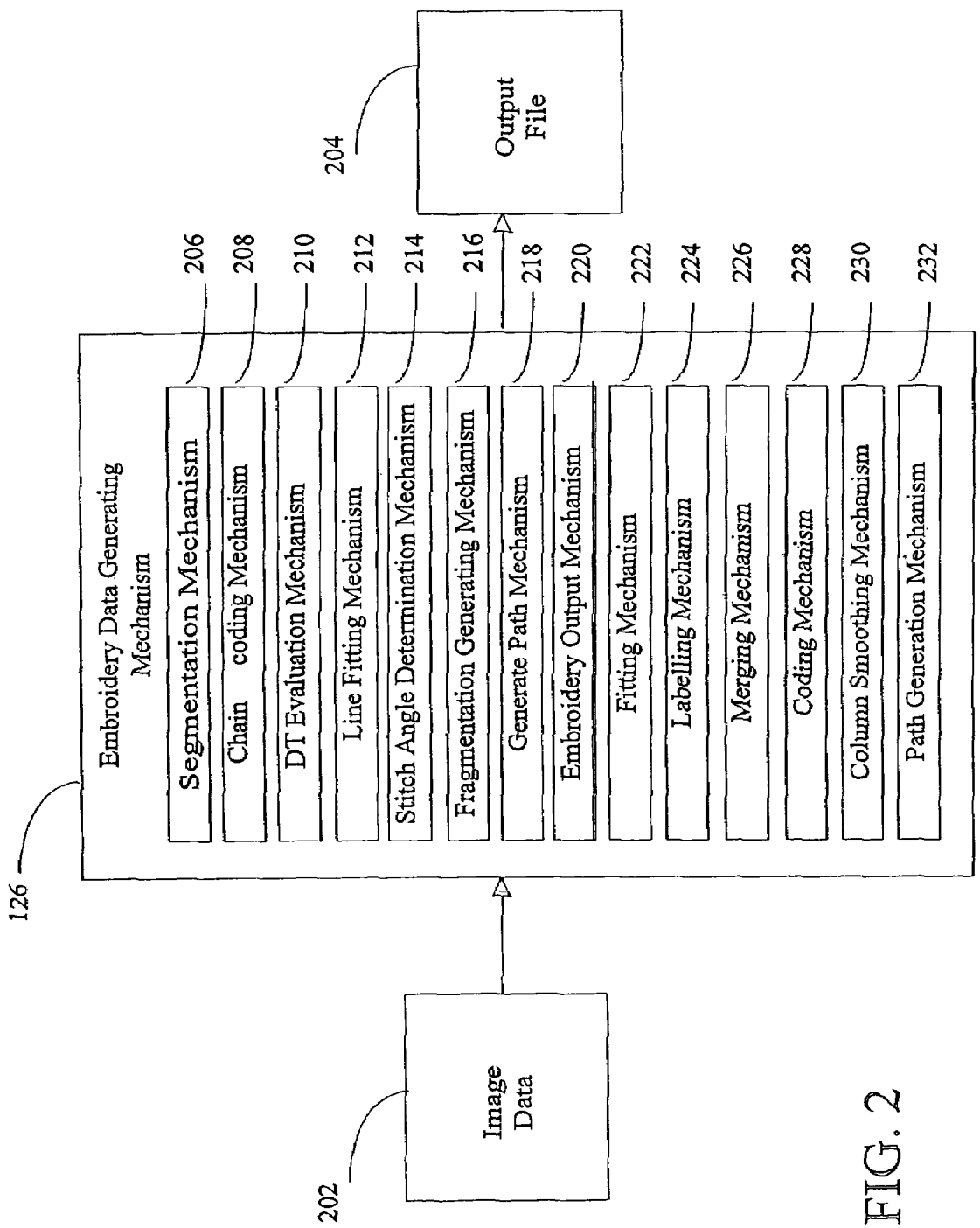
FIG. 2 is a block diagram depicting the processing of embroidery information in accordance with a preferred embodiment of the present invention.

Referring now to FIG. 2, a block diagram depicting the processing of embroidery information in accordance with a preferred embodiment of the present invention is shown. Generally, the present invention supplies a file containing image data 202 to embroidery generating mechanism 126 (as indicated by the leftmost right pointing arrow). In turn, embroidery data generating mechanism 126 executes a series of sub-mechanisms on image data file 202 and produces an embroidery output file 204 (as indicated by the rightmost right pointing arrow) which contains data that is fed to a sewing device for stitching the embroidery design.

Embroidery data generating mechanism 126 contains a segmentation mechanism 206, a chain coding mechanism 208, a DT evaluation mechanism 210, a line fitting mechanism 212, a stitch angle determination mechanism 214, a fragment generating mechanism 216, a generate path mechanism 218, an embroidery output mechanism 220, a fitting mechanism 222, a labelling mechanism 224, a merging mechanism 226, a coding mechanism 228, a column smoothing mechanism 230 and a path generating mechanism 232.

When a user first scans in an embroidery pattern, a software program within the scanner creates a representation of the pattern, referred to in this specification as image data 202. Image data 202 is broken up into small objects called pixels. Each pixel in the image data 202 has an associated color. Each unique color in the scanned pattern has its own unique bitmap. For purposes of the present invention, it should be assumed that image data 202 contains 24-bit color, 300 dpi bitmapped information.

Before embroidery data generating mechanism 126 executes on image data 202, image data 202 is in its raw form and the bitmapped data stored within the file has not yet been error-corrected. For example, before embroidery data generating mechanism 126 executes on image data 202, some pixels of image data 202 may have incorrect bitmap assignments due to noise distortion during the scan. For example, a pixel may have been assigned a color which is not a correct representation of that pixel.

Once image data 202 has been scanned, embroidery data generating mechanism 126 executes segmentation mechanism 206. Segmentation mechanism 206 classifies each pixel within image data 202 as belonging to a distinct object, where each object represents a particular contiguous or connected region in the image data. Any pixels that were not categorized into a particular object during the first segmentation may be considered noise, generated during scanning when the scanner could not properly assign a color for a particular pixel.

Each pixel has a series of eight neighboring pixels, and it is likely that at least one of these neighboring pixels has been assigned to a particular object. Segmentation mechanism 206 assigns an uncategorized pixel to an object where a neighboring pixel has been assigned. It should be understood that each of the eight neighboring pixels may belong to more than one object. Segmentation 206 mechanism uses mathematical methods to determine which object to which an uncategorized pixel should be assigned.

Once segmentation mechanism 206 segments image data 202 into objects, chain-coding mechanism 208 performs further image processing on each individual object within image data 202. Chain-coding mechanism 208 chain codes each object's edge contours and then uses the chain-coded contours to compute the skeleton and 3-4 integer distance transform (herein referred to as DT) information for each object.

After the execution of chain-coding mechanism 208, embroidery data generating mechanism 126 executes DT evaluation mechanism 210. DT computation mechanism 210 classifies each object into one of two categories. Either the object is a thick object or a thin, predominantly regular object. Whether the object is classified as a thick object or a thin, predominantly regular object determines the next series of processing steps needed to generate output embroidery data for each object. A thick object is stitched in rows using fill stitch, whereas a thin object is stitched in columns using a satin stitch (also referred to as a zig-zag stitch).

Figure 3:
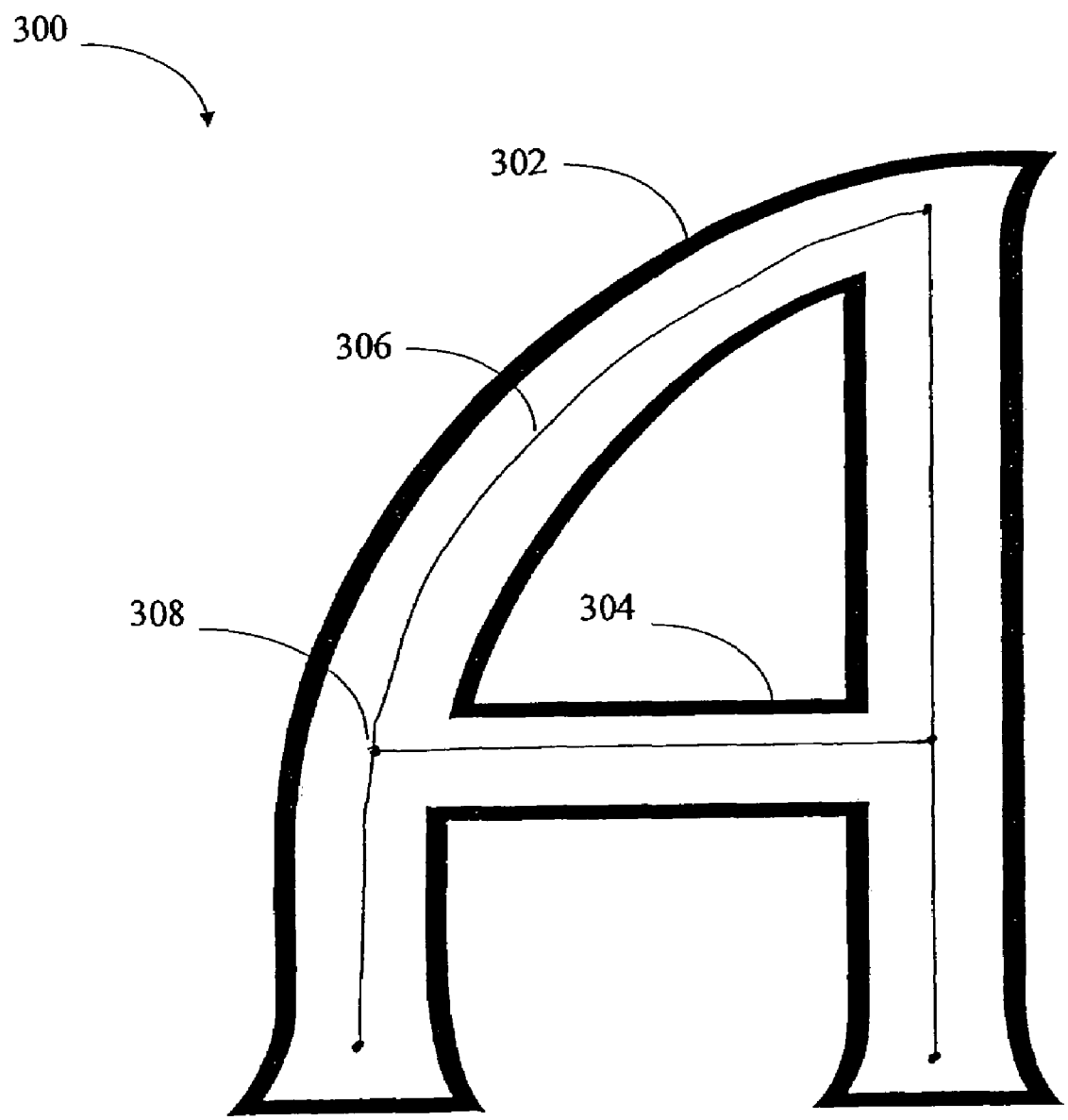
FIG. 3 is an example of a thin object.

Now referring to FIG. 3, a thin line object 300 is shown for purposes of defining terms contained within this specification. The letter "A" has been identified herein as a thin line object present in the image data. As described above, since object 300 is a thin line object, it is to be stitched using a satin stitch.

Object 300 contains an external edge contour 302, an internal edge contour 304, a series of skeletal branches 306 and a number of nodes 308. External edge contour 302 can be described simply as the outer edges of a line object. Similarly, internal edge contour 304 can be described as the inner edges of a line object. Skeletal branches 306 represent the approximate midpoint between external edge contours 302 and/or internal edge contours 304. Nodes 308 represent areas where skeletal branches 306 intersect.

Again referring to FIG. 2, as mentioned above, DT evaluation mechanism 210 determines whether an object is a thick object or a thin, regular object. If DT evaluation mechanism 210 determines that the object is thick, embroidery data generating mechanism 126 executes line fitting mechanism 212. Line fitting mechanism 212 stores all external edge contours and internal edge contours of the line object in discrete data structures.

Once line fitting mechanism 212 executes, embroidery data generating mechanism 126 executes stitch angle determination mechanism 214. As mentioned, thick objects are stitched in rows using fill stitching. It is desirable to stitch adjacent parallel rows continuously at a single fixed angle such that needle repositioning is minimized and continuity is preserved. Stitch angle determination mechanism 214 determines an optimum angle for the fill stitching, so as to minimize needle repositioning during the fill.

Fragment generation mechanism 216 is executed by embroidery generating mechanism 126 after line fitting mechanism 212 finishes executing. Fragment generation mechanism 216 separates the fill stitching into a series of sub-regions called fragments. Each fragment corresponds to a maximal area that may be filled at a specified angle/direction using a single fill stitch operation (i.e., without any needle repositioning). A modified scan-line fill algorithm is utilized when breaking up an object into a set of maximal fragments. Sixteen different scan angles are used to determine the angle that is the most optimal, that is the angle which generates the smallest number of fragments.

Once fragment generation mechanism 216 executes, embroidery data generating mechanism 126 executes generate path mechanism 218. Generate path mechanism 218 determines the order that fragments should be sewn so as to minimize or eliminate thread cutting. Generate path mechanism 218 also determines the most optimal locations for the points where sewing of a fragment begins and ends (typically referred to as the entry and exit points).

After the execution of generate path mechanism 218, embroidery data generating mechanism 126 executes embroidery output mechanism 220. Embroidery output mechanism 220 produces an embroidery output file containing all data necessary to stitch the thick object including the proper angles, fragments and start/exit points.

If DT computation mechanism 210 determines that an object in image data 202 is a thin object, embroidery data generating mechanism 126 executes line fitting mechanism 212. Line-fitting mechanism 212 determines and creates a data structure for each external edge contour, internal edge contour, skeletal branch and node within the thin object. These data structures are used to create points needed for stitching the embroidery pattern.

Once line fitting mechanism 212 processes a thin object, embroidery data generating mechanism 126 executes labelling mechanism 224. A thin object is made up of object contours which are the outermost portions of a line and skeleton branches which delineate the approximate midpoint lying within the line. Labelling mechanism 224 determines the location of all vertices on a line object and categorizes a subset of these vertices as being either end point anchors or junction point anchors. These anchors are used to further delineate or provide bounds for the simple continuous column-like regions that compose a thin object. The regions bounded by these anchors are synonymous with the regularities of the object.

Embroidery data generating mechanism 126 executes merging mechanism 226 after labelling mechanism 224 labels all vertices. Merging mechanism 226 performs additional processing on objects to detect certain acute characteristics present in the object that would be detected by a human expert. Merging mechanism 226 may detect serif-like sections of an object, like those used in conjunction with the Times Roman type font. The serifs are present at the top and bottom sections of the letter "A". These particular characteristics are detected based upon rules that have been hard-coded into merging mechanism 226.

After embroidery data generating mechanism 126 executes merging mechanism 226, coding mechanism 228 executes. Coding mechanism 228 eliminates singular regions of a thin object so that connected regularities can be sewn as single continuous columns or strokes. Coding mechanism 228 utilizes contour anchor points at each singular region. When coding mechanism 228 finishes execution, all final stroke representation needed for embroidery satin stitch data point generation are produced.

Embroidery data generating mechanism 126 then executes column smoothing mechanism 230. Column smoothing mechanism 230 removes discontinuity among consecutive stroke normals generated by coding mechanism 228.

After column smoothing mechanism 230 executes, embroidery data generating mechanism 126 executes path generating mechanism 232. Path generating mechanism 232 ensures that no thread cuts will be required during the sewing of a contiguous stroke region, thereby increasing the efficiency of stitching the embroidery pattern.

During the execution of column smoothing mechanism 230, embroidery data generating mechanism 126 executes embroidery output mechanism 220. Embroidery output mechanism 220 produces an embroidery output file containing all data necessary to stitch the thin object including the proper columns and start/exit points.

Figure 4:
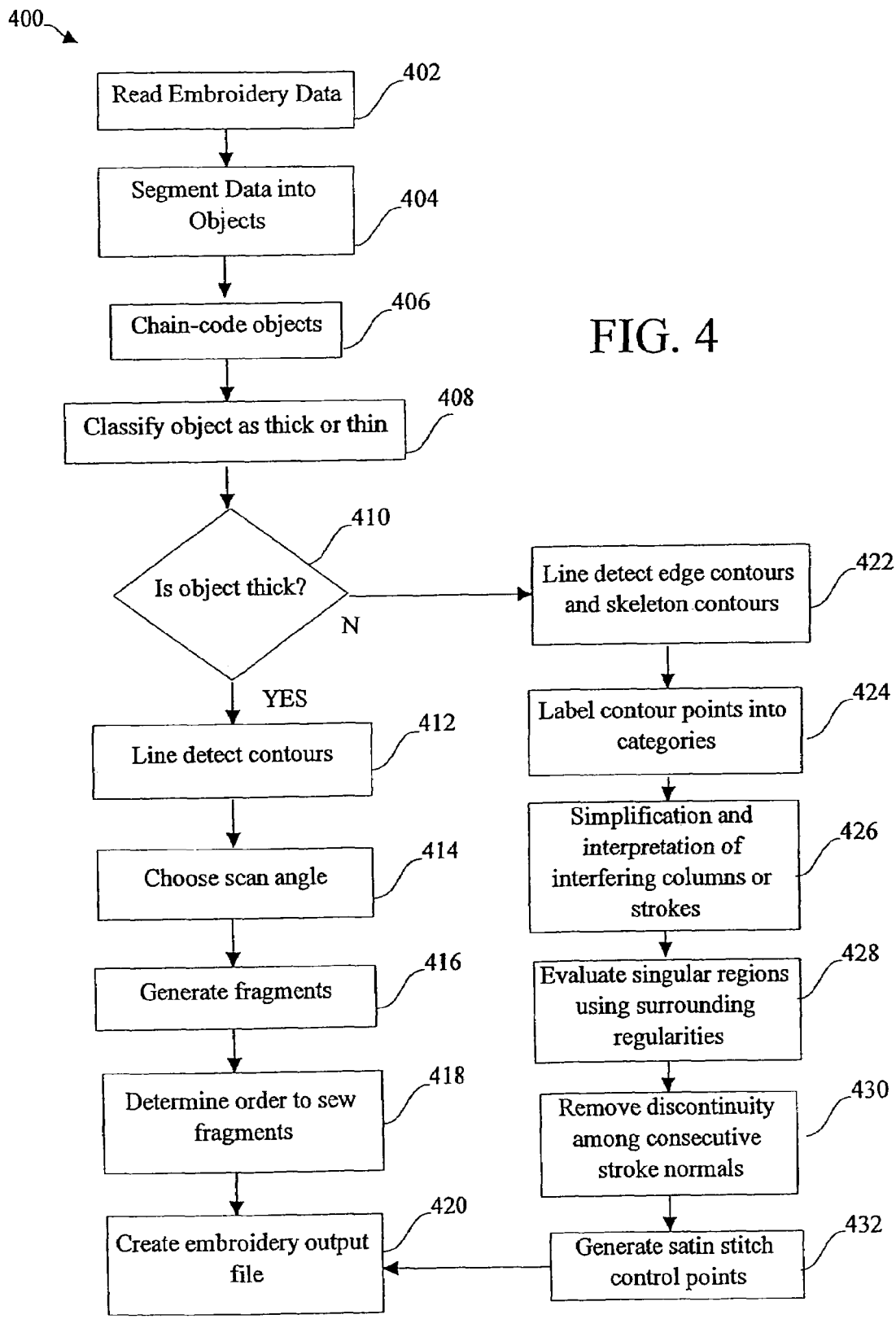
FIG. 4 is a flow chart illustrating a method for automatically generating an embroidery design from a scanned embroidery pattern in accordance with a preferred embodiment of the present invention.

Now referring to FIG. 4, a method 400 for automatically generating an embroidery design from a scanned embroidery pattern is shown. Method 400 begins in step 402 when the embroidery generating mechanism reads image data that has been input into a data file using a scanner.

As described above, the scanner generates a bitmapped file representation of the scanned pattern.

In step 404, the embroidery generating mechanism executes the segmentation mechanism. The segmentation mechanism segments contiguous regions of similar color into objects, each object having a unique object identification. Segmentation consists of several processing steps. The first step, selectively smoothes the image to eliminate noise classified as "salt and pepper" noise and to increase color homogeneity between pixels belonging to areas of similar perceived color. This step is unique from other standard smoothing operators in that the distortion of edges (sometimes termed edge dilation) is avoided. Specifically, a pixel area or neighborhood is evaluated to first see if it is an area of high contrast (indicating the presence of an edge). If this is the case, the area is not smoothed to preserve the edge direction and location. However, areas of low contrast are smoothed by performing a weighted average of surrounding color values to promote the type of homogeneity discussed above.

After smoothing, region growing operations are sequentially initiated at points of low contrast (as determined above) to create a starting set of image segments or objects. The growing operation allows pixels near these starting points to be added to an associated segment if their color is similar to that of the starting point's.

Any pixels that have not been segmented into objects are usually found around areas of high contrast or noise in the image. Each uncategorized pixel is absorbed into an object which neighbors the uncategorized pixel. The segmentation mechanism compares the closeness of an uncategorized pixel as well as the color similarity of the uncategorized pixel to determine the neighboring object to which the uncategorized pixel should be merged.

Once all pixels in the bitmap have been categorized into objects by the segmentation mechanism, the segmentation mechanism removes any objects containing less than six pixels, since it is assumed that these objects represent mere noise. The segmentation mechanism then assigns the pixels belonging to these noise regions with the object identification of the nearest larger neighboring object.

Figure 13:
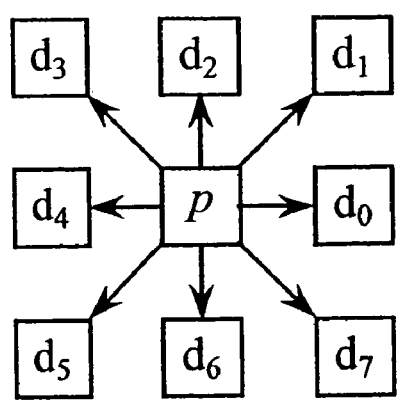
FIG. 13 depicts the eight possible chain-code values and the associated directions. A sample chain-code with appropriate chain-code values is also illustrated.
Figure 13:
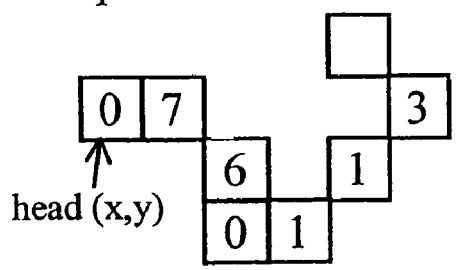

In step 406, the embroidery generating mechanism executes the chain-code mechanism. Chain coding mechanism 208 actually performs thinning and DT computation in addition to generating chain codes for the segmented image data. Chain coding mechanism 208 operates by performing a single raster scan of the now segmented image data and creating strings of chain-codes that represent the closed contours (or edges) of each object. A single object always has one closed exterior contour representing the outer most edge of the object, but may also have one or more closed interior contours representing one or more holes in the object. Chain-coding these contours involves detecting the pixels which lie on these contours (i.e. the edges of an object) and relating them to one another as a single string of continuous locations. Specifically, a single pixel on one of these edge contours is chosen as a chain-code head for the contour and as such is specified by storing its x,y location in a discrete data structure. Then, the next pixel specified by the chain code is a subsequent edge pixel that touches or is connected to the previous pixel in the chain (in this case the head pixel). The location of the next pixel is stored in a discrete data structure by specifying its location relative to the previous pixel. This relative position may indicate that the pixel lies one pixel to the east, northeast, north, northwest, west, southwest, south, or southeast of the previous edge pixel. As such, a type of directions are provided which allow a contour's chain-code to be traversed starting from it head and working around the entire edge. FIG. 13 shows for a pixel p, the eight neighboring pixels' relative chain-code directions. Once all object contours are encoded in this fashion and stored in the computers memory, this information serves as input to the thinning/DT computation algorithm. This algorithm is an extension of the approach presented in Paul C. Kwok's paper, "A Thinning Algorithm by Contour Generation" in Communications of the ACM (November 1988). A detailed description of this algorithm is beyond the scope of what is presented here. Its basic premise is to evaluate consecutive chain-code directions to allow sections of chain-code (3-pixels long) to be categorized. Then, based on the specific categorization, a section of new chain-coded contour may be produced immediately toward the interior of the existing contour. This process is continued until an entirely new chain-coded contour is created within the immediate interior of the existing contour, effectively "shaving off" the outer most edge of the object (i.e. thinning the object). Then, the process continues iteratively using the newly generated chain-code contour as input. The process stops when a newly generated contour represents a single pixel-wide area within the center of an object known as the object's skeleton.

The algorithm has been extended to also efficiently compute the (3, 4) distance transform (DT) for each pixel contained within an object during contour generation. An integer distance transform, such at the (3, 4) DT, sometimes termed the chamfer DT, attempts to approximate the Euclidean distance from any non-feature pixel (in this case, a pixel in the interior of an object) to the nearest feature pixel (the nearest pixel exterior to the object). A thorough description and examination of DTs is presented by Gunilla Borgefors paper, "Distance Transformations in Digital Images," in Computer Vision, Graphics and Image Processing (vol. 34, 1986).

Figure 14A:
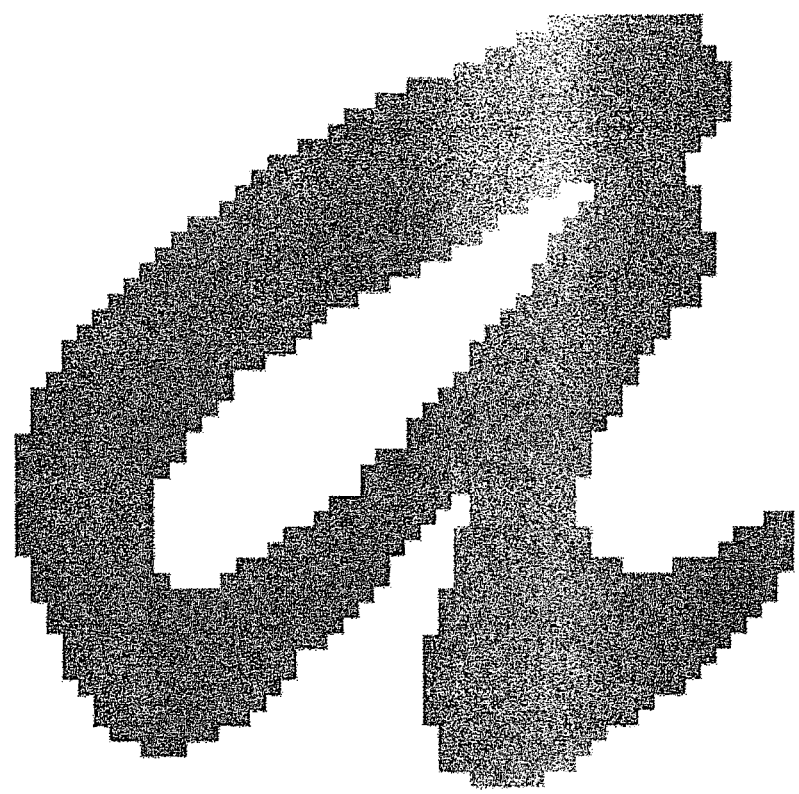
FIGS. 14a and 14b show an example of a thin, predominantly regular object.
Figure 14B:
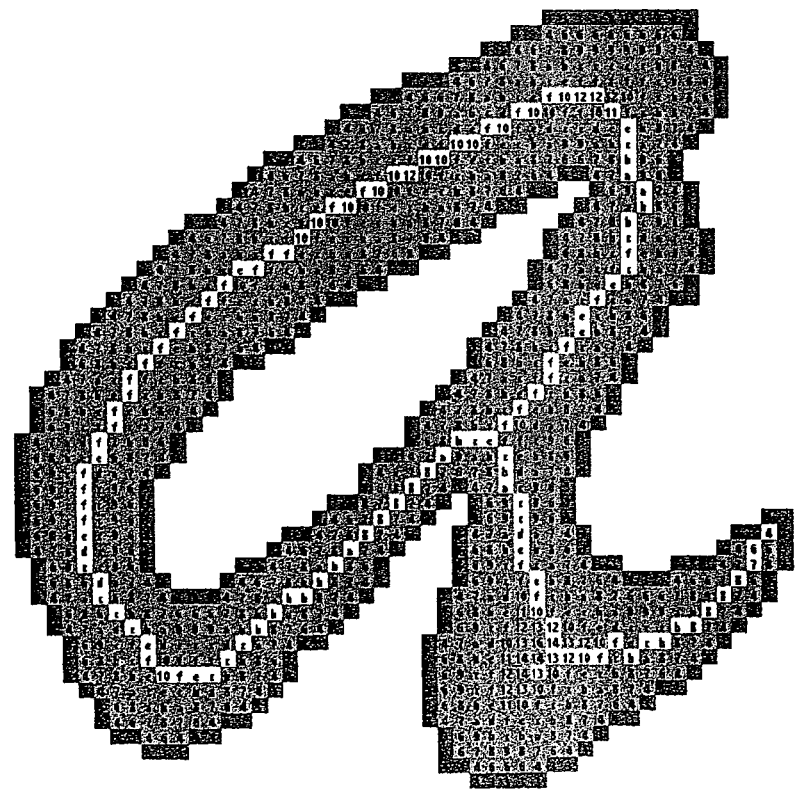

An illustration of the chain-coded contours, skeleton, and DT values of an object is presented in FIG. 14. Note, DT values in FIG. 14 are written in hexadecimal to conserve space. A DT value may be normalized by dividing the value by three. This normalized value indicates the approximate distance to the nearest boundary of the object. In this figure, chain-coded pixels are highlighted in dark grey while skeletal pixels are highlighted in white. The method of chain-coding, skeletonization and DT computation is not fundamentally important within the context of the present invention. Other methods for their computation are described throughout the literature. It is simply required that this information be computed by some means and is made available for use and evaluation by subsequent mechanisms of the present invention.

Once the chain-coding mechanism 208 executes, the embroidery data generating mechanism executes the DT evaluation mechanism 210. The DT evaluation mechanism classifies each object in the image data as being either a thick object or a thin, predominantly regular object. As explained above, a thick object is stitched in rows using fill stitch whereas a thin object is stitched in columns using satin stitching.

The DT evaluation mechanism is able to classify each object since all thin objects are characteristically made up of regular regions. Predominantly regular regions display properties of constant thickness with few areas of singularity (e.g. where multiple regions intersect). The DT evaluation mechanism detects regular objects by examining the DT values of pixels on the skeleton of the object (refer to FIG. 14).

For regular regions these pixels typically contain distance transform values that fall within a relatively narrow range. In effect, for a regular region, no significant variation (increase or decrease) should exist of the associated skeletal pixels' labeled distance transform values. In other words, a lack of such deviation signifies that the region represented by the skeleton is of relatively uniform thickness and direction.

Thus, DT evaluation mechanism 210 operates by computing several mathematical statistics for the DT values present at skeletal pixel locations. Again, these skeletal pixels are the center most interior points of an object and define the shape of an object's overall skeleton as described earlier and illustrated in FIG. 3. The statistics computed include (but are not limited to) the maximum (max) of these DT values, the arithmetic mean ($\mu$) of these DT values, and the standard deviation ($\sigma$) of these DT values. After statistics are computed, rules are constructed which categorize an object based on arithmetic relationships between any combination of the various computed statistics and/or experimentally determined thresholds. For example, if $$2\cdot\sigma < \mu < \tfrac{1}{2}\cdot\text{max}$$

then the object is considered predominantly regular. Also, if max and $\mu$ are less than predefined threshold values the object may also be considered thin. Any objects that do not meet these criteria may be considered thick. Additional relationships or rules may be established to further distinguish between thin predominantly regular objects or thick objects. Although not currently employed here, it may also be possible to compute such statistics for each skeletal branch allowing classification to be performed within various regions of a single object. Subsequent processing after this mechanism executes is significantly different depending on whether an object is classified as a thick object or a thin predominantly regular object.

Once the DT evaluation mechanism classifies an object as either thick or thin, step 408, the embroidery data generating mechanism determines whether an object has been classified as thick, step 410. If an object has been classified as thick, step 410, the embroidery data generating mechanism executes the line fitting mechanism, step 412.

The line fitting mechanism detects sections of object contours which may be approximated as discrete line segments. Hence, these contours are now characterized as polygons instead of complex strings of connected pixels. This process also eliminates any minor noise that may be present along the edge of an object.

Figure 5:
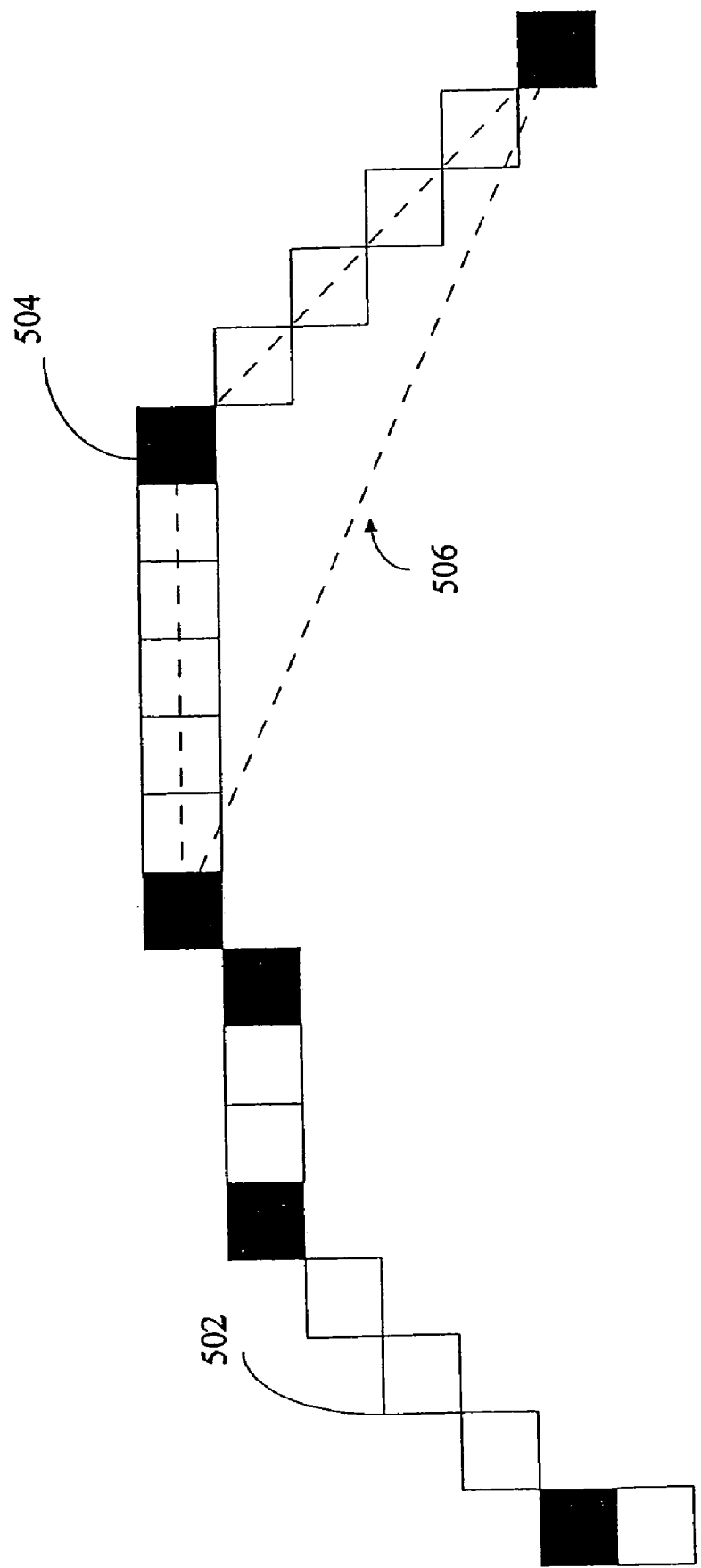
FIG. 5 depicts line detection called triangular filtering.

Now referring to FIG. 5, a method that can be used for line detection termed triangular filtering is shown. FIG. 5 contains a plurality of pixels 502 wherein a number of vertices have been identified 504, as differential chain-code points, as indicated by the black fill. Three vertices 504 form points on a triangle 506, as indicated by the dotted line. Vertices 504 are eliminated based on the height of the triangle formed by itself and neighboring differential points. Specifically, if a triangle height is below a particular threshold value, its associated vertex is eliminated from the poly-line approximation.

Prior to the poly-line approximation process for object contours, an additional step must be performed to maintain the connectivity between independent objects within a scanned image. When first extracting the differential chain-code points, it may seem reasonable to create associated poly-line vertices at the center of those extracted points. However, within this context, it is very important that this is not done since all connections between adjacent objects would then be lost. Instead, points are assigned toward the edge of associated chain-code based upon the surrounding chain-code directions.

Figure 15A:
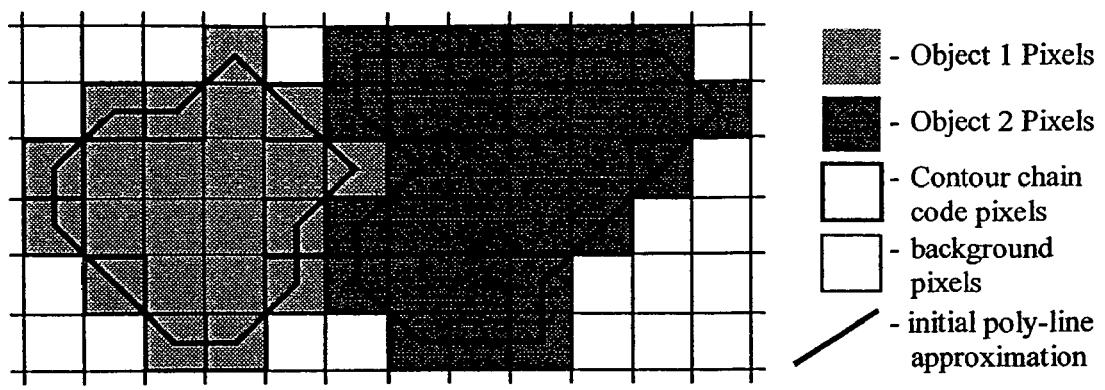
FIG. 15a shows a naive conversion of edge pixels into a bounding edge contour where connections between objects are lost.
Figure 15B:
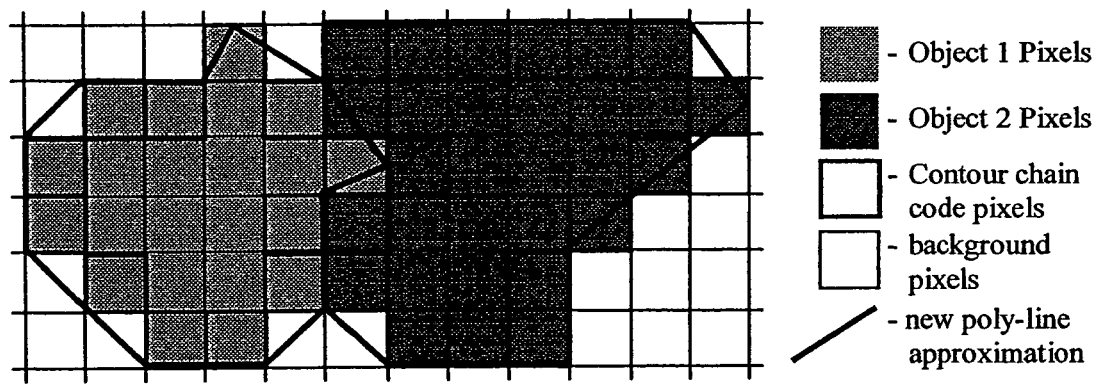
FIG. 15b depicts the results of the technique described within the context of the present invention.
Figure 16:
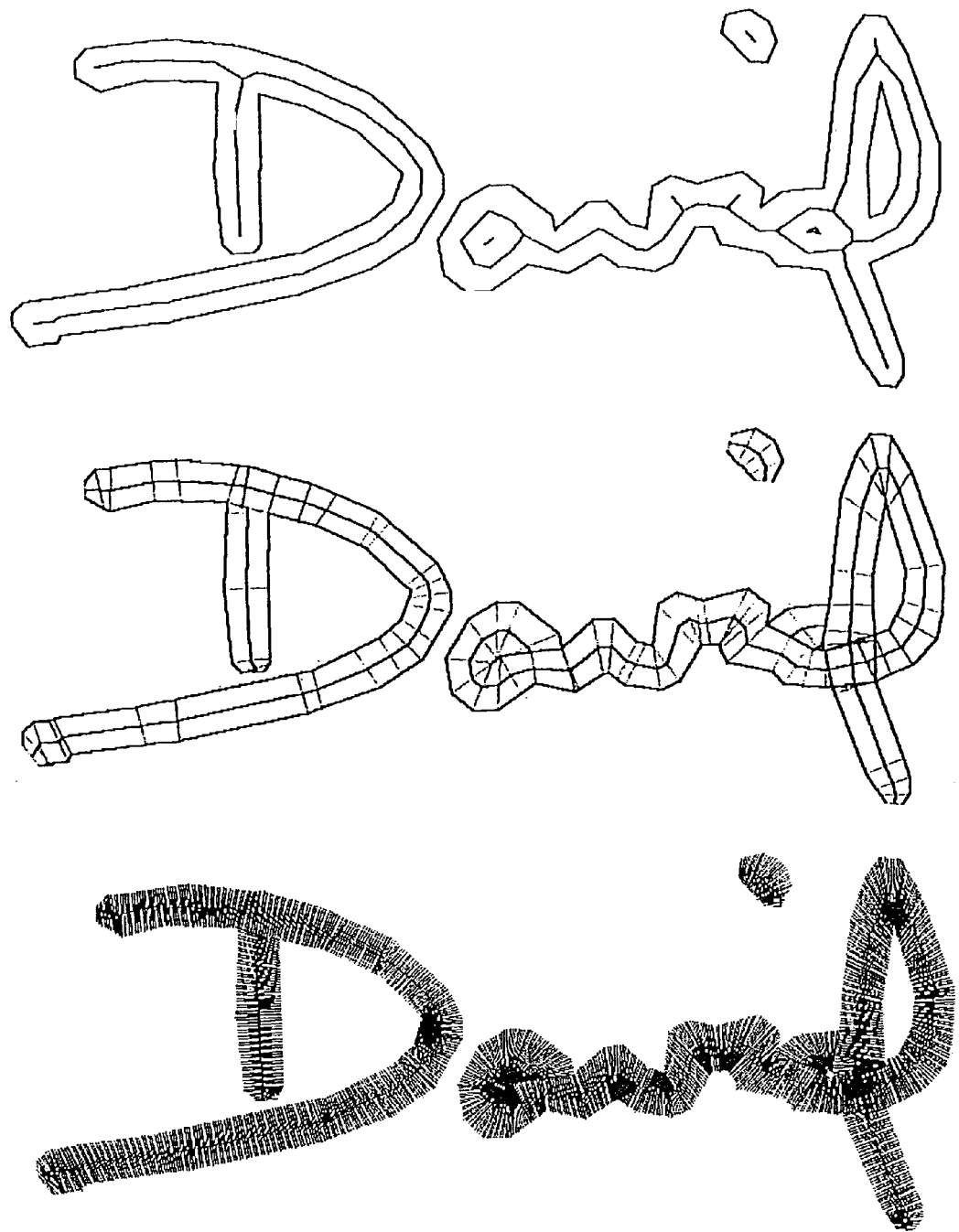
FIG. 16 shows an example depicting three stages in processing the original scanned artwork; contour and skeleton coding, stroke or column extraction with associated column normals shown; and final stitch output produced from the embroidery data file generated.

The chain-code contexts are organized in a manner similar to the method presented for contour generation. More precisely, the difference between the current and previous chain-code values is used to classify the particular case for poly-line vertex generation. Additionally, fixed vertices (i.e., vertices which may not be removed during triangular filtering) are placed at the outer edge of contour chain-codes where the touching or adjacent object has changed. This is done to ensure that the two objects always begin to share a common edge at this fixed anchor point. The final result of this effort is that objects sharing a common pixel boundary now also share a common poly-line boundary as shown in FIG. 15.

In order for this property to be maintained, one additional change must also propagate to the implementation of the triangular filtering. Specifically, when triangle heights are computed and multiple vertices have an equivalent minimum height, the choice for removal must not be arbitrary. Instead the vertex removed is chosen to be the one which lies closest to the origin in Cartesian coordinates. This guarantees that, among different objects sharing common boundaries (i.e., between fixed anchor points), the same set of vertices are removed in the same order during their associated triangular filter operations.

As mentioned, thick objects or fill stitch regions require significantly less processing than do thin or satin-stitch regions. However, some processing must be performed to ensure that the most optimal stitch angle is used to fill stitch a thick object. Specifically, thick objects must be sewn as continuous rows of stitching laid down in adjacent parallel rows of a single fixed angle throughout the entire object. The order in which the physical stitches are sewn is constrained whereas the angle at which the physical stitches may be sewn is more flexible.

For fill stitch regions it is most desirable to be able to start sewing rows of stitches in a quasi-scan-line ordering at one side of the object and to continue sewing until the other side of the object is encountered. However, because the region may contain holes or complex concavities, this may not be possible since the sewing needle may not be lifted without leaving a thread trail. Thus, a single fill region may have to be fragmented into smaller sub-regions which are each individually able to be sewn out in a continuous scan-line manner.

After a sub-region is sewn, the thread may be cut or, if possible, running stitches may be generated to move to the beginning of the next un-sewn sub-region. It should be noted that in embroidery designs, thread cuts impose a significant sewing time penalty they are, in general, undesirable. Thus, when creating embroidery data, thread cuts are eliminated or minimized whenever possible. One method of reducing the number of thread cuts within a complex fill region is to choose a sewing direction that minimizes the number of fragments or sub-regions that must be created.

Once again referring to FIG. 4, the embroidery generating mechanism executes the stitch-angle determination mechanism, step 414. The stitch-angle determination mechanism chooses a scan angle from sixteen possible scan angles that generates the fewest fragments for the object. Specifically, for each possible scan angle the region is fragmented via the fragment generation mechanism and the total number of fragments generated using that particular scan angle is stored in memory. After all sixteen scan angles are used, the angle chosen is the one which caused the fewest fragments to be generated.

Figure 6A:
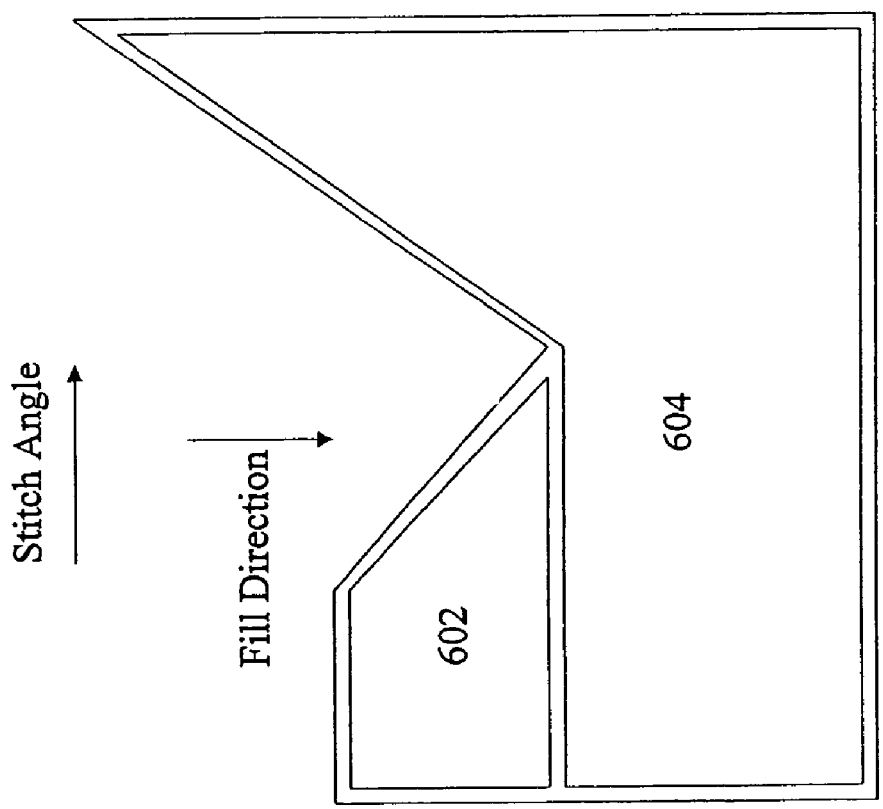

Now referring to FIG. 6a, a stitch fill region 600 is shown. Stitch fill region 600 is shown as segmented using a downward fill direction and associated left to right fill angle. As shown, stitch fill region 600 has a first segment 602 and a second segment 604. Using the downward fill direction and left to right fill angle requires that fill stitch region 600 be broken into two regions.

Now referring to FIG. 6b, stitch fill region 600 is again shown. However, now a left to right fill direction and an upward pointing stitch angle is used. Using these directions for fill and stitch, stitch fill region 600 may be sewn as a single fragment and does not need to be broken up into smaller regions. Thus, in this example, the stitch angle demonstrated in FIG. 6b would be chosen over the stitch angle demonstrated in FIG. 6a since the stitch angle in FIG. 6b produces fewer fragments.

Referring again to FIG. 4, once the stitch angle determination mechanism chooses an angle that minimizes fragmentation, the embroidery generating mechanism executes the fragment generation mechanism, step 416. With a minimum set of fragments generated for a fill stitch object, an optimal ordering of the fragments must now be derived. Specifically, the fragments should be sewn in a particular order as to both minimize thread cuts and run stitching while maintaining path connectivity as much as possible. Once fragments are generated, step 416, the embroidery generating mechanism executes the generate path mechanism, step 418, to determine the most optimal order for sewing the fragments.

The entry and exit points into the region (i.e., where sewing begins and ends) can be any points on an exterior contour belonging to the region. Then, the fragments that are touched at these points may be determined easily. The fragment corresponding to the region exit point is examined first. Here, a recursive procedure is defined which traverses the remaining fill fragment regions starting from this ending region. As recursive calls are completed, control points for fill fragments are generated until finally, the ending region's control points are generated. The order in which fragments are traversed is dependent on several factors. Ideally, after a single fragment is traversed or sewn, running stitches should be generated within the interior of the global region to the entry point of the next fragment to be traversed or sewn.

It is preferable to use running stitches instead of individual thread cuts and needle up movements between fragments since the associated overhead is significantly less. The running stitches generated between fragments must eventually be covered up when the fragments fill stitching is sewn. The desire to eliminate thread cuts implies that, while sewing a fill region, the needle is always down (i.e., leaving a trail of stitching behind it). Thus, the planning of fill fragments and running stitches sewn between them is quite important.

Additionally, it may occur that such an ordering is impossible with the given minimum set of fragments provided (That is, the algorithm is forced to sew itself into a corner so to speak.) To avoid this, one may either introduce a thread cut and use needle up movements to gain access to remaining un-sewn portions of the object, or a further fragmentation of the original fragments may be performed. This additional fragmentation allows the sequence of traversed fragments to continue at the cost of increasing the total number of fragments or sub-regions that must be sewn. This cost could be significant if shifts or buckles in the material being sewn occur due to the excessive movement between multiple fragments.

Ultimately, this could lead to fragments becoming misaligned with one another or not meeting precisely at their boundaries causing noticeable spaces within the fill region. Thus, fragments should be sewn in as continuous a manner as possible. A recursive algorithm must be used which requires that previously during fragment creation, each fragment was marked as to how it was created. For example, a previously existing fragment was split causing the creation of a new fragment connected to the previous fragment at its start edge or start scan-line. The mid-line or poly-line of each fragment is also computed as the path from start line to end line lying at the mid-points between the vertices marked on the left and right side of the fragment. This mid-line is used to determine a suitable path to move upon from the sewing needle's current position to the entry point for the next fragment to be generated.

Once the generate path mechanism finishes executing, step 420 the embroidery data generating mechanism executes the embroidery output mechanism.

If the object was not classified as a thick object, step 410, the object is a thin object to be sewn with satin stitch. When an object is classified as a thin object by the DT evaluation mechanism, step 408, the embroidery generating mechanism executes the line fitting mechanism, step 422. Like the line fitting mechanism performed in step 412, the line fitting mechanism of step 422 performs line fitting on the external and internal contours of the thin object. However, the line fitting mechanism additionally represents the skeletal branches and nodes in data structures, step 422. Specifically, skeletal branches are represented as minimal sets of connected line segments instead of long strings of connected pixels. Relationships such as the specific nodes that various branches connect and the number of branches that meet at any given node are maintained within discrete data structures to provide easily accessible and appropriate information for subsequent processing steps.

Generating control points for satin stitch regions is significantly more complex than generating those points needed for fill object stitching. This is predominantly due to the fact that extracting intuitively shaped strokes from a static bitmap is an inherently difficult problem. Most of this difficulty occurs when attempting to interpret the singular regions of a stroke image. The methods presented here involve finding characteristic edge vertices using the geometric properties of both the skeleton and edge contour as well as distance transform information present at and around skeletal nodes.

Once the line fitting mechanism executes, step 424, the embroidery data generating mechanism executes the labeling mechanism. The labeling mechanism identifies and classifies points on the outer contour, the inner contour(s), the skeleton contour within various categories.

Now referring to FIG. 7, thin object 500 is again shown with additional labelling as performed by the labelling mechanism, step 424. Thin object 500 now includes an end node 702, a junction node 704, a junction point anchor 706, a skeletal branch vertice 708 and an end node DT value 710.

The labeling mechanism labels the skeleton contour at junction nodes 704 and end nodes 702 which effectively indicate points at which singularities or discontinuities are present in the thin object.

Using this labelled information, characteristic edge vertices are found which delineate the boundaries of regular regions. Here, two different types of characteristic edge vertices are defined and located: junction point anchors 706 and end point anchors 710. Each junction point anchor 706 characterizes a specific concavity formed in the skeletal representation where two skeletal branches 708 intersect.

An end point anchor is a vertex on the object contour that is associated with a skeletal node of degree 1. The degree of a skeletal node is the number of branches that emanate from it.

Figure 7:
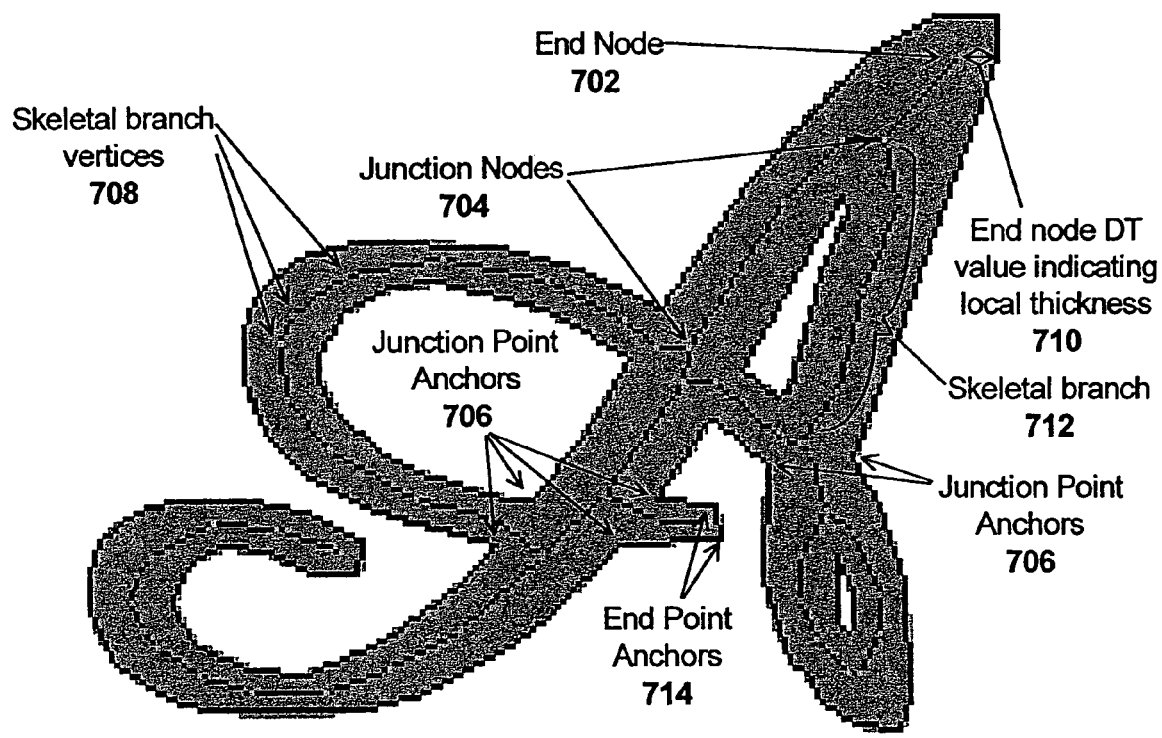
FIG. 7 shows the thin object of FIG. 3 after skeletal contour, outer contour and inner contour locations have been labelled.

Examples of both types of anchor points are shown in FIG. 7. After locating these anchor points, each skeletal branch not eliminated due to the removal of artifacts has associated left and right contours.

More specifically, these contours are delineated and bounded by the left and right anchor points found at the skeletal nodes present at either end of the skeletal branch. The embroidery generating mechanism executes the anchor locating mechanism to determine the location of end point anchors.

Figure 8:
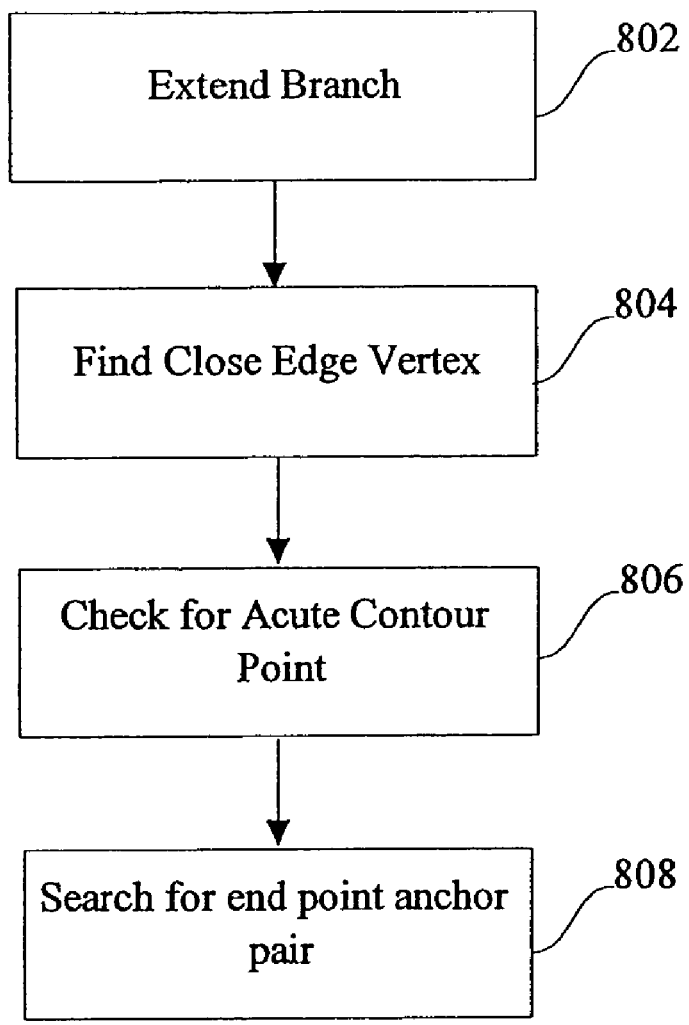
FIG. 8 depicts a method for locating left and right end point anchors within a thin object.

Now referring to FIG. 8, a method for locating left and right end point anchors within a thin object is shown at reference numeral 800. Method 800 begins when the anchor locating mechanism extends the skeletal end node in the direction of the entering skeletal branch, step 802.

The direction of the extension is considered to be the generalized direction of the singularity at which the branch is terminated. This direction is recorded for use in later steps. The actual extension of the skeletal branch is proportional to the local thickness of the end node so that the branch is guaranteed not to extend beyond the boundaries of the object.

Additionally, the local thickness (average DT value along the skeletal branch end) is used to compute a maximum search distance utilized in other steps. One final reference measurement taken is the generalized start angle for the singularity. This value is the angle of the normal vector to a slightly more interior point of the skeletal branch or the normal to the average vector of two approximately parallel edge vectors located on either side of the ending region.

Once all branches are extended, step 802, the end point anchor locating mechanism executes to find the closest edge vertex, step 804. The closest edge vertex is located by finding the closest edge contour point nearest to the extended skeletal end point node.

The end point anchor locating mechanism checks for a sufficiently acute contour point, step 806. Specifically, the contour bend angle at the point located is computed, step 806. This angle may indicate that a sufficiently sharp convexity (i.e., an acute angle less than a predefined threshold, such as 30 degrees) exists. If so, this branch is considered to end at a single sharp point. Both the left and right end point anchors are defined at this point. Otherwise, if the left and right neighbor vertices of the edge vertex are also close to the extended skeletal end point (not more than twice the distance of the closest vertex), the system checks for a sufficiently acute vertex at these vertices. If, of the three vertices checked, none is sufficiently acute, the left and right end point anchors are determined in subsequent steps.

The anchor locating mechanism searches for an anchor pair by searching for a pair of end point anchor points that most closely meets the following criteria, step 808. The search should start with the closest edge contour point and then should progress toward neighboring connected contour points. The search should continue until either the distance traversed on the contour (from the located close point) exceeds the maximum computed search distance or until a maximum of four neighboring vertices adjacent on either side of the close vertex are examined.

For each connected and adjacent pair of vertices within the set of examined vertices, vector angles are computed for the section of contour that the adjacent vertices represent. The vector entering the left vertex of the two adjacent vertices and the vector leaving the right vertex should both be compared to the computed extension angle. These two vectors should be in opposite relative directions compared to the extension angle. If they are not, the associated vertices are rejected as end point anchor candidates.

For all pairs of end point anchors not rejected the angle of the vector between the two anchors is computed and the deviation from the start angle is recorded. The pair chosen is the pair the vector angle of which is closest to the computed start angle in direction and closest to the computed local thickness in magnitude.

In addition to testing adjacent contour points as possible anchor candidates, non-adjacent pairs are also tested. Specifically, contour points that are separated by a single contour vertex are tested as anchor point candidates Using a similar approach, the system tests for approximately opposite but parallel entry and exit vectors.

If none of these search heuristics produces a suitable set of end point vertices, the vertices are both chosen to be located at the closest contour convexity point. Once the end point vertices are calculated, the embroidery data generating mechanism executes the junction anchor points determination mechanism.

Figure 9:
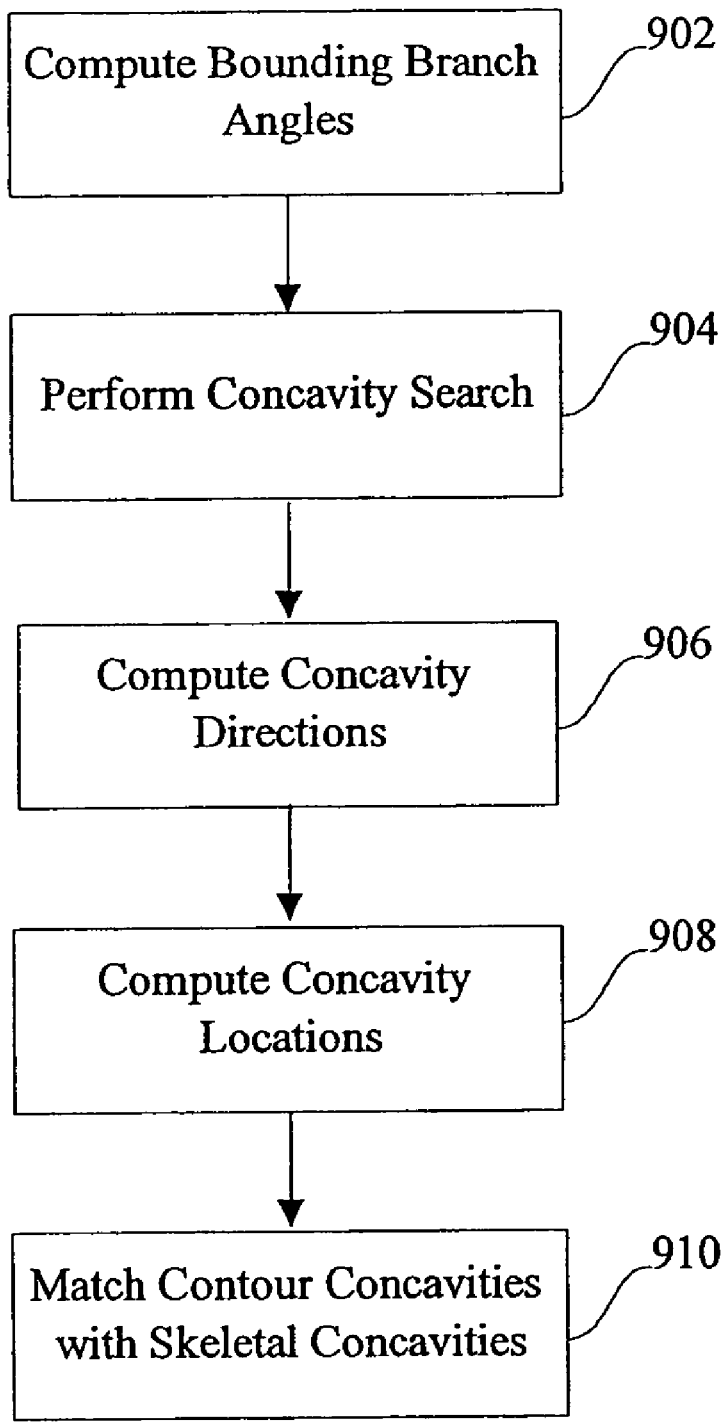
FIG. 9 demonstrates a method for determining junction anchor points.

Now referring to FIG. 9, a method 900 begins when the embroidery data generating mechanism executes the junction anchor points mechanism to determine stroke junction anchor points. The junction anchor points mechanism computes bounding branch angles, step 902.

These bounded branch angles are computed by traversing each connected branch from the given node to find a point whose distance from the node is equal to the nodes DT value. Then a single line connecting the node to that point specifies a vector with a given angle, termed the branch angle, originating from the node. This angle is computed for each branch originating at the skeletal junction node. A range of angles is constructed for each consecutive pair of branches moving in a clockwise order. This range is simply a measure of the skeletal concavity formed between branches entering at the node and effectively partitions the surrounding 2D space into n areas (where n is the number of branches entering this node).

Once bounding branch angles are computed, the anchor points determination mechanism executes to search for contour concavities that map to skeletal concavities, step 904. The search should be within a search distance proportional to the junction node's local thickness (i.e., its DT value) and the magnitude of the skeletal concavity. Specifically, the search distance is chosen as:

$$(DT\ \text{value}) * 10^{(2Pi-theta)}$$

where theta is the angle between the two associated skeletal branch vectors.

Once contour concavities are found, the junction anchor points determination mechanism executes to compute concavity directions, step 906. This value is a vector indicating the midpoint in the angular distance between the two edge contour segments connected at the concavity point.

The anchor points determination mechanism computes relative concavity location, step 908, by deriving the angular location and distance of each contour concavity point from the associated skeletal node. Once the relative concavity location is computed, in step 910 the anchor points determination mechanism chooses a matching contour point for each skeletal concavity. This is accomplished by choosing the closest contour concavity point the concavity direction of which lies closest to the center of angular distance of a skeletal concavity.

Also, the relative concavity location should fall within the bounded range of the skeletal concavity to which it is mapped. Thus, for each skeletal concavity there should exist a corresponding edge contour concavity point. (Exceptions may occur in the case of elongation artifacts where no contour concavity may be located.)

After the junction anchor points determination mechanism finishes executing, the skeleton should be annotated with characteristic edge vertices. Counter intuitive distortions of a region's skeleton due to thickness of the region, known as artifacts, may be removed. For example, when two sufficiently thick, straight lines cross at a sharp angle, the generated skeleton may represent this intersection as a line segment between two pairs of skeletal branches. While this may be a more accurate geometric interpretation of the intersection, it is not indicative of the intuitive topography of the shape.

This specific type of artifact is called a bifurcation. When two thick lines join at a single point and at a significantly sharp angle, a similar artifact is produced called an elongation artifact. When two contour anchor points are shared (i.e., or in common) between two nodes sharing an associated skeletal branch, a bifurcation artifact may be identified and the nodes may be merged at the midpoint between the two.

Figure 10:
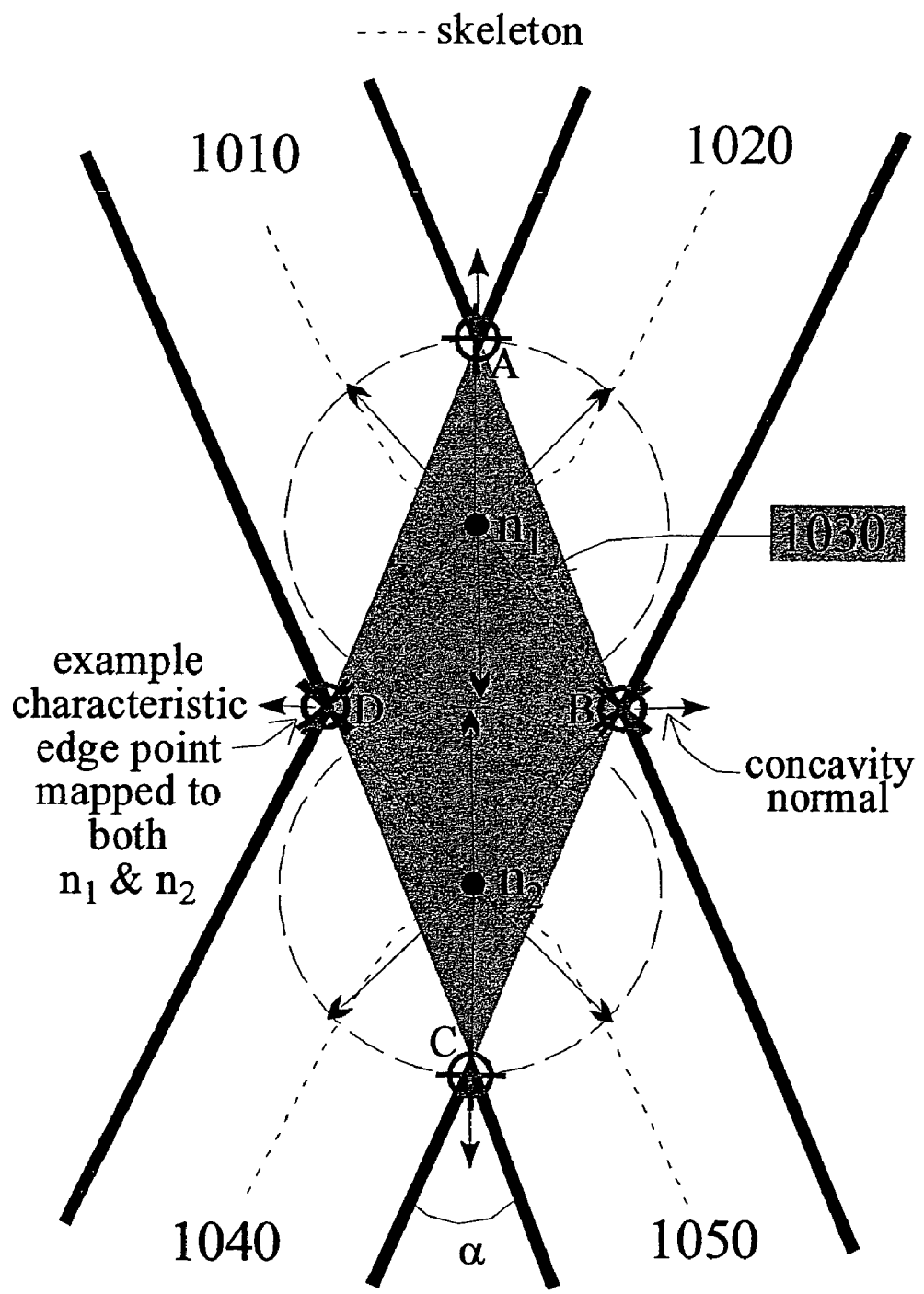
FIG. 10 depicts two line regions or strokes of a thin object intersecting at a sharp angle.

Now referring to FIG. 10, a first line segment 1010 and a second line segment 1020 are shown intersecting each other at a midpoint 1030. A plurality of skeletal nodes are shown as n1 and n2 and are discovered to be the end points of a bifurcation. However, notice that it is insufficient to detect this case by checking for an overlap of local thickness circles as proposed previously in the literature.

Instead, characteristic edge vertices are located at a plurality of points A, B, C and D. When it is discovered that the two nodes share a common skeletal branch, the two associated characteristic edge vertices are examined for similarity. If both nodes have been mapped to the same two characteristic edge vertices (in this case D and B), the nodes are merged.

The location of each characteristic edge vertex is bounded by associated branch angles in the figure shown as vectors originating from nodes n1 and n2. As the angle between any two of these vectors increases, so does the bounding distance within which characteristic edge vertices may be located. Specifically, the following equation is used:

Search Distance=$(DT\text{ value})*10^{(2Pi+theta)}$ where theta is the angle between two branch vectors. The constant value of 10 was chosen empirically. Lower or higher values may be chosen; they affect the heuristic's propensity to merge nodes which are far apart.

Similarly, for elongation artifacts, if contour anchor points cannot be located on either side of a branch angle, the related branch is eliminated with movement of the related skeletal nodes to approximate the branch's midpoint. An additional constraint must specify that the maximum length of the elongation branch be less than the maximum characteristic edge vertex search distance (see Search Distance defined above).

When a branch is eliminated and the two related nodes are merged (whether due to the presence of an elongation or bifurcation artifact) the endpoints of all remaining branches attached at the two original nodes are effectively "pulled" toward a new junction point. This new junction point is located at the midpoint of the branch between the two nodes.

Referring again to FIG. 4, once the labelling mechanism finishes executing, the embroidery generating mechanism executes the merging mechanism, step 426. After the skeleton and contours are labeled and correlated, further simplification and interpretation may be performed. In addition to the removal of bifurcation and elongation artifacts, sets of hard coded procedures are used to check for other special cases occurring within the representation extracted thus far.

The foregoing procedures are a type of static knowledge base that further delineates how regular and singular regions should be interpreted for the specific task of embroidery mark point generation. The rules coded here are application specific and take into account the methods a human expert would use to create embroidery for stroke like regions. An example of one such rule would be the location and interpretation of types of serif-like fonts described above.

The presence of these regions may be detected using the surrounding skeletal, contour, label, and DT data extracted thus far. The first indicator is a skeletal node of degree 3 in which two of its branches are sufficiently short and terminate at nodes of degree 1.

A second criterion is formulated by examining the characteristic edge points associated with the two termination nodes at the end of these branches. Specifically, the left end point anchor of one branch should be directly connected to the right end point anchor of the other branch (or vice-versa) via a single contour line segment. Then, one final criterion ensures that the serif merges smoothly with the main column. Here, the associated junction point anchors are evaluated. If they do not represent a significantly sharp or acute contour concavity, the merge is considered to be smooth.

Once the serif-like region is identified, the two associated short serif branches are removed and endpoint anchor points for the remaining branches are redefined to lie at the left and right endpoint anchor points of the eliminated branches.

The combination of skeleton, distance transform, contour, and characteristic edge point information allows a user to create intuitive rules to recognize special cases. These static rules, formulated by a human expert for the targeted domain, are an adequate solution to interpreting specific areas of stroke (e.g., region) appropriately.

The coding mechanism executes to evaluate singular regions using surrounding regularities, step 428. The remaining singular regions located around skeletal junction nodes are indicative of a set of interfering regular regions. These regular regions merge at the associated singularity causing any continuity between the set of regularities to be occluded. Processing described here attempts to reconstruct the occluded stroke or contour information by utilizing a simple energy minimization strategy.

While this strategy may not always be able to reconstruct the exact dynamics of the singular region as it was originally created, it does provide at least one interpretation suitable for the singularity's dynamic recreation using embroidery stitching. The overall idea of the strategy is to match appropriate pairs of regular regions entering the singularity.

Reconstructing the required occluded boundaries between their regions then joins these regular regions such that they may be sewn as a single continuous column or stroke. Conditions for matching two regular regions joined at a singularity include energy minimization criteria, so that joining the two regions does not result in any sharp discontinuity or area of high energy. The occluded boundaries, which are reconstructed, are also created to eliminate as much discontinuity as possible, such that the final stitching generated within the regularity does not appear erratic or aesthetically improper.

As an example, refer to FIG. 10. Here, the singularity present at the intersection area of the two line regions is interpreted. Using the above criteria it is determined that stroke area 1010 should continue through the singularity to connect with stroke area 1050. The occluded boundaries through the singularity are reconstructed by having contour point A continue or connect to contour point B, and having contour point D continue or connect to contour point C. Thus, a single extended regularity now replaces stroke areas 1010 and 1050. Similarly, stroke area 1020 is connected to stroke area 1040 and contour point A is connected with D and contour point B is connected with C.

As contour anchor points are now created at all appropriate locations and interpretation of each singular region is accomplished, the regular regions now delineated may be processed further. Specifically, a more robust description of the region is computed by interrelating the pairs of contours that enclose associated regular regions (i.e., strokes or columns). This processing step produces the final stroke representation needed for embroidery satin stitch data point generation.

Contour points on opposite sides of a skeletal branch are connected via vectors considered to be orthogonal or normal to the stroke at those points. Stroke normals are created using the method outlined herein below.

Figure 11:
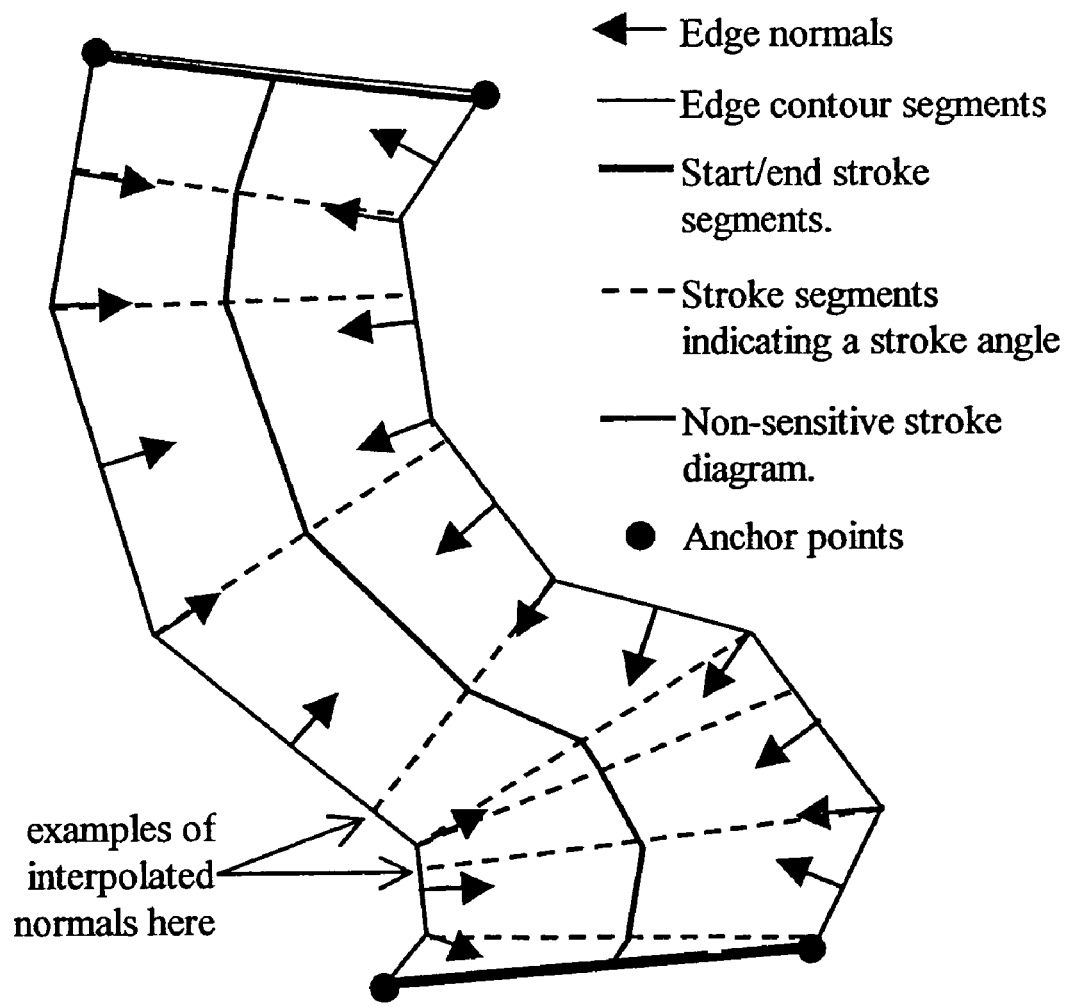
FIG. 11 shows a segment of a thin object for which stroke cross-sections are extracted.
Figure 12A:
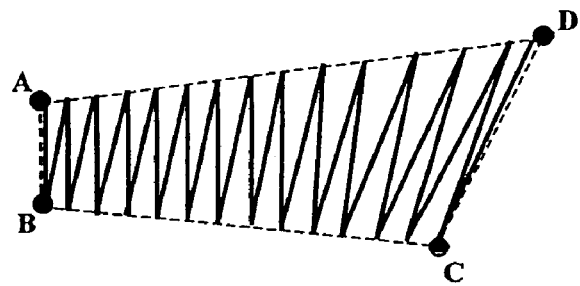
FIGS. 12a and 12b depict examples of primitive data points required to generate a set of satin stitches or a set of fill stitches respectively.
Figure 12B:
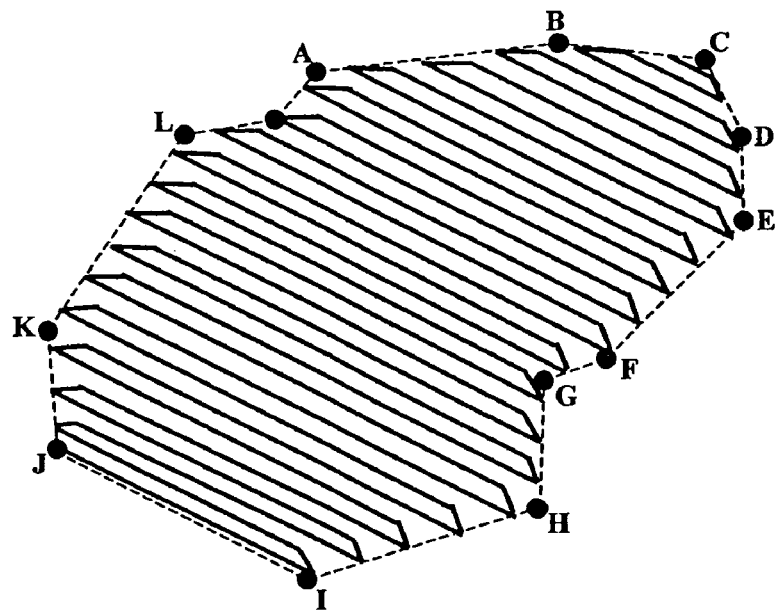

Now referring to FIG. 11, a portion of a thin object to be sewn with satin stitch is shown. Thin object 1100 comprises a plurality of edge normals 1102, a plurality of edge contour segments 1104, a plurality of start/end stroke segments 1106, a plurality of stroke segments indicating a stroke-angle 1108 and a plurality of non-sensitive stroke diagrams 1110.

Edge normals 1102 are computed at consecutive contour points between associated anchor points. These normals face inwardly toward the skeletal branch.

A stroke normal is then defined as a start stroke segment (i.e. the segment between the left and right anchor points at the skeletal node from which the branch originates). The angle of this segment, known as the stroke angle, is computed.

The next edge point that lies closest to the previous stoke normal is then found by traversing the left and right contours of the stroke. The contour point is then connected to an opposite edge contour point. The coding mechanism calculates for a least squares minimum between the angle of this newly crated stroke segment and the corresponding contour normals it connects. Included in this least squares computation is also a measurement of the stroke normal's length proportional to the average column width at that point. The result is that a stroke normal of minimal length connects two edge points at which the gradient is approximately equal but opposite.

Interpolation is incorporated in this process to allow points between contour vertices to be mapped or connected to opposite side contour vertices. The mechanism continues to find the next edge point and connect the contour point until the ending set of left and right anchor points is encountered.

During the above procedure, it is possible that certain contour vertices may be skipped over during the matching process. To handle this case, placeholders are inserted for the skipped vertices. These vertices are matched at a later time. The stroke normals created at these points must lie within the bounds of the stroke normals already created before and after them.

Referring again to FIG. 4, once the coding mechanism executes, the embroidery data generating mechanism executes the column smoothing mechanism, in step 430. The column smoothing mechanism customizes the region description to embroidery data point generation. This step is a smoothing operation in that it attempts to remove discontinuity among consecutive stroke normals, making the transition from one stroke to the next more "smooth".

Column smoothing is performed iteratively by examining three consecutive stroke normals at a time. If the center points of the three normals fall within a straight line (within a small variation proportional to the column's thickness), the second column normal in the set is examined.

If the first and third normals imply a trend that is not exhibited by the second column normal, the angle of this middle normal is adjusted and an additional normal is added if this results in an orphaned contour point.

Additionally, the first and last column normal of an entire column are always examined. The length of these normals is recorded. Subsequent adjacent normals that are within this length are adjusted to ensure a smooth transition at the endpoints of a column.

This processing is most needed when generating columns which begin or end with serifs. With more continuity between stroke normals, smaller interpolations are required during stitch generation, which also usually leads to better performance on the associated sewing equipment.

Hence, while the previously discussed processing is not a strict requirement for embroidery data point generation, it inevitably leads to more improved embroidered designs.

One other operation performed by the column smoothing mechanism is the detection of sharp or high discontinuity in a sequence of column normals. This situation typically arises when a column or stroke-like region bends sharply. An example of this would be the uppercase letter "N". In this example, there are two locations where lines meet at an angle of less the 45 degrees. Stitching continuously around such areas of sharpness may produce unfavorable results. This is usually due to excessive interpolation of associated stitching causing a sparseness on one side of the column and a bunching or overstitching on the opposite side. To remove this problem, the column smoothing mechanism breaks the column into two separately sewable regions that meet at the area of sharpness. Thus, in the example of the uppercase letter "N", the diagonal line region would be extended on either end and made into a single column of satin stitches. Subsequently, the two vertical lines would be shortened slightly at the area where they meet the diagonal and would then also be sewn as independent columns of satin stitch.

When the column smoothing mechanism is finished executing, the embroidery data generating mechanism executes the path generation mechanism, step 432. The path generation mechanism generates satin stitch embroidery control points that correspond to the end points of each stroke normal.

However, there still exists the important issue of how the strokes should be ordered or traversed during the control point generation process. This problem is similar to the issue of how fill region fragments should be ordered and sewn when generating fill stitch objects. Optimization criteria include minimizing thread cuts and maintaining stroke continuity. Specifically, several path planning algorithms are executed which generate a set of possible paths (i.e. stroke or column orderings) that may be used to generate an appropriate sequence of embroidery control points such that all columns of a thin object are specified or sewn. At least one of these paths is guaranteed to generate embroidery data for the thin object without requiring any thread cuts. The specific mechanism used to generate such a path may be specified as a recursive algorithm.

This algorithm is provided, as input, a start or entry node within the thin object and then proceeds to traverse (by generating run stitch control points) skeletal branches and nodes emanating from this node recursively until all branches and nodes have been visited. As each recursive call completes, the satin stitch control points, for the column associated with the particular skeletal branch being traversed, are output. A recursive call completes (at a given node for a given branch) only when all other branches connected at that node have been traversed (i.e. marked) via other recursive calls. Special cases, such as loops, are uniquely handles such that they are sewn continuously. For example, one would traverse a cursive lower case "1" as a single stroke rather than an upside down v stroke with a second connected oval stroke on its top.

In certain situations, avoiding thread cuts (i.e. never allowing the needle to be lifted and relocated) may cause columns within a thin object to be sewn with less continuity. For example, the sewing of a single long column or stroke may be interrupted at various points to sew other columns that connect to the column at those points. Interrupting the sewing of a continuous column in this way may introduce phenomenon such as material buckling or movement depending on the magnitude of the interruption. The approach presented here measures this magnitude as the combined length of other columns that are sewn before sewing returns or continues along the initial long column. If a sufficiently large magnitude interruption is detected, the path planning mechanism attempts to generate a new different path around the associated columns such that the magnitude is reduced. The computational efficiency of this technique may degrade to the point of computing all possible paths for a thin object. Eventually, the path chosen is the one where the combined magnitude of interruptions is minimal.

Once path generation mechanism generates the control points, the embroidery data generating mechanism executes the embroidery output mechanism, step 420. It should be understood that all objects within the embroidery data are processed until mark points for each object are generated. Once the embroidery output file is generated, any sewing device can use the information contained within the file to stitch the embroidery design.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of generating embroidery data from image data, comprising:
   identifying an object from the image data, wherein the object corresponds to a contiguous portion of an image defined by the image data, and wherein the object defines an area to be embroidered and an area distinct from the object and entirely surrounded by an inside edge of the object;
   automatically identifying a singular region within the object;
   generating occluded boundary information associated with the singular region, wherein the occluded boundary information represents a merging of at least two regular regions of the object into a single continuous area to be embroidered; and
   generating the embroidery data based on the occluded boundary information.

2. A method as defined in claim 1, wherein the singular region is identified as being associated with at least one of a convergence and a termination of at least one of the plurality of regions.

3. A method as defined in claim 1, wherein the singular region is identified as being associated with a convergence of edges associated with the image data.

4. A method as defined in claim 1, wherein automatically identifying the singular region includes analyzing skeletal data.

5. A method as defined in claim 4, wherein the skeletal data is generated using a distance transform algorithm that processes edge contour data.

6. A method as defined in claim 1, wherein the image data is associated with a scanned image.

7. A method as defined in claim 1, wherein the image data includes a bitmap.

8. A method as defined in claim 1, wherein generating the embroidery data based on the occluded boundary information comprises generating the embroidery data based on energy minimization information.

9. A method as defined in claim 1, wherein the area distinct from the object corresponds to an area to not be embroidered.

10. A method as defined in claim 1, further comprising automatically identifying one or more edges of the object based on the image data.

11. A system for generating embroidery data from image data, comprising:
    a memory; and
    a processor coupled to the memory and programmed to:
      identify an object from the image data, wherein the object corresponds to a contiguous portion of an image defined by the image data, and wherein the object defines an area to be embroidered and an area distinct from the object and entirely surrounded by an inside edge of the object;
      identify a singular region within the object;
      generate occluded boundary information associated with the singular region, wherein the occluded boundary information represents a merging of at least two regular regions of the object into single continuous area to be embroidered; and
      generate the embroidery data based on the occluded boundary information.

12. A system as defined in claim 11, wherein the singular region is identified as being associated with at least one of a convergence and a termination of at least one of the plurality of regions.

13. A system as defined in claim 11, wherein the singular region is identified as being associated with a convergence of edges associated with the image data.

14. A system as defined in claim 11, wherein the processor is programmed to identify the singular region by analyzing skeletal data.

15. A system as defined in claim 14, wherein the skeletal data is generated using a distance transform algorithm that processes edge contour data.

16. A system as defined in claim 11, wherein the image data is associated with a scanned image.

17. A system as defined in claim 11, wherein the image data includes a bitmap.

18. A system as defined in claim 11, wherein the processor is programmed to generate the embroidery data based on the occluded boundary information using energy minimization information.

19. A system as defined in claim 11, wherein the area distinct from the object corresponds to an area to not be embroidered.

20. A system as defined in claim 11, wherein the processor is further programmed to identify one or more edges of the object based on the image data.

21. A machine readable medium having instructions stored thereon that, when executed, cause a machine to:
    identify an object from the image data, wherein the object corresponds to a contiguous portion of an image defined by the image data, and wherein the object defines an area to be embroidered and an area distinct from the object and entirely surrounded by an inside edge of the object;

identify a singular region within the object;

generate occluded boundary information associated with the singular region, wherein the occluded boundary information represents a merging of at least two regular regions of the object into a single continuous area to be embroidered; and generate the embroidery data based on the occluded boundary information.

22. A machine readable medium as defined in claim 21, wherein the singular region is identified as being associated with at least one of a convergence and a termination of at least one of the plurality of regions.

23. A machine readable medium as defined in claim 21, wherein the singular region is identified as being associated with a convergence of edges associated with the image data.

24. A machine readable medium as defined in claim 21 having instructions stored thereon that, when executed, cause the machine to identify the singular region by analyzing skeletal data.

25. A machine readable medium as defined in claim 24, wherein the skeletal data is generated using a distance transform algorithm that processes edge contour data.

26. A machine readable medium as defined in claim 21, wherein the image data is associated with a scanned image.

27. A machine readable medium as defined in claim 21, wherein the image data includes a bitmap.

28. A machine readable medium as defined in claim 21, wherein the instructions, when executed, cause the machine to generate the embroidery data based on the occluded boundary information using energy minimization information.

29. A machine readable medium as defined in claim 21, wherein the area distinct from the object corresponds to an area to not be embroidered.

30. A machine readable medium as defined in claim 21, wherein the instructions, when executed, cause the machine to identify one or more edges of the object based on the image data.

* * * * *